(12) United States Patent
Rajapakse et al.

(10) Patent No.: US 9,118,678 B2
(45) Date of Patent: *Aug. 25, 2015

(54) INDIRECT CLOCK MEASURING AND MEDIA ADJUSTMENT

(71) Applicant: Blackfire Research Corporation, San Francisco, CA (US)

(72) Inventors: Ravi U Rajapakse, San Francisco, CA (US); Ian McIntosh, San Francisco, CA (US)

(73) Assignee: Blackfire Research Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/489,474

(22) Filed: Sep. 18, 2014

(65) Prior Publication Data

US 2015/0006945 A1 Jan. 1, 2015

Related U.S. Application Data

(63) Continuation of application No. 14/084,585, filed on Nov. 19, 2013, now Pat. No. 8,880,929.

(60) Provisional application No. 61/728,212, filed on Nov. 19, 2012.

(51) Int. Cl.
*G06F 1/12* (2006.01)
*H04L 29/08* (2006.01)
*H04N 21/43* (2011.01)
*H04N 21/439* (2011.01)
*H04N 21/442* (2011.01)

(52) U.S. Cl.
CPC ............ *H04L 67/10* (2013.01); *H04N 21/4305* (2013.01); *H04N 21/4394* (2013.01); *H04N 21/4424* (2013.01)

(58) Field of Classification Search
USPC ........................................... 713/600; 700/94
See application file for complete search history.

(56) References Cited

U.S. PATENT DOCUMENTS

| | | | | |
|---|---|---|---|---|
| 5,875,354 | A * | 2/1999 | Charlton et al. | 710/61 |
| 7,639,706 | B2 * | 12/2009 | Hamada et al. | 370/428 |
| 2009/0185695 | A1 * | 7/2009 | Marton et al. | 381/66 |
| 2014/0143587 | A1 * | 5/2014 | Rajapakse et al. | 713/600 |

\* cited by examiner

*Primary Examiner* — Vincent Tran
(74) *Attorney, Agent, or Firm* — Galvin Patent Law LLC; Brian R. Galvin

(57) ABSTRACT

A method for indirectly measuring the clock rate of a media rendering subsystem, in a media rendering device that has a separate hardware clock for rendering the media, by using the rate at which data requests are made of the CPU in the media rendering device and using the CPU clock to provide additional accuracy in measuring the clock rate.

6 Claims, 18 Drawing Sheets

INDIRECT CLOCK MEASURING AND MEDIA ADJUSTMENT

CROSS-REFERENCE TO RELATED APPLICATIONS

This application is a continuation of U.S. patent application Ser. No. 14/084,585, titled "INDIRECT CLOCK MEASURING AND MEDIA ADJUSTMENT" filed on Nov. 19, 2013, which claims the benefit of, and priority to, U.S. provisional patent application Ser. No. 61/728,212, titled "INDIRECT CLOCK MEASURING AND MEDIA ADJUSTMENT" and filed on Nov. 19, 2012, the entire specifications of each of which are incorporated herein by reference.

BACKGROUND OF THE INVENTION

1. Field of the Art

The disclosure relates to the field of digital media, and more particularly to the field of synchronized digital multimedia playback.

2. Discussion of the State of the Art

Today there are many forms of digital media, many types of digital media sources, many types of digital media playback (rendering) systems and lots of ways of connecting media sources to media playback systems.

Digital media, hereafter referred to as media, comes in many forms, formats and containers, including Digital Video Disks, media files and media streams. The media contents can be audio, video, images or metadata media components and various combinations of each. For example a popular audio format is known as MP3 and a popular video format is H264. MP3 is an audio-specific media format that was designed by the Moving Picture Experts Group (MPEG) as part of its MPEG-1 standard and later extended in the MPEG-2 standard. H264 is a standard developed by the International Organization for Standardization (ISO)/International Electrotechnical Commission (IEC) joint working group, the Moving Picture Experts Group (MPEG). Movies are typically multimedia formats with a video and multiple audio channels in it. For example a 5.1 movie contains 1 video channel (media component) and 6 audio channels (audio components). 5.1 is the common name for six channel surround sound multichannel audio systems.

Digital media sources include media devices such as Digital Video Disk players, Blu-ray players, computer and mobile devices, and internet based "cloud" media services. Blu-ray Disc (BD) is an optical disc storage medium developed by the Blu-ray Disc Association. Internet based media services include services such as Netflix™ and Spotify™. Netflix is a media service and trademark of Netflix Inc. Spotify™ is a media service and trademark of Spotify Ltd. Digital media playback (media rendering destinations) systems include computer based devices, laptops and smartphones, as well as network audio and video devices. A SmartTV is an example of a digital media-rendering device that can play media from an internet (cloud) based media service such as Netflix™. A SmartTV, which is also sometimes referred to as "Connected TV" or "Hybrid TV", is used to describe the integration of the internet and Web features into modern television sets and set-top boxes, as well as the technological convergence between computers and these television sets/set-top boxes. An Internet radio device is another example of a digital media rendering device.

The connectivity between these media sources and devices is varied, but is evolving over time towards network-based connectivity using IP protocols. This is because IP connectivity is convenient, ubiquitous and cheap. IP stands for Internet Protocol. An IP networked device is a device that adheres to the Internet Protocol suite standard. The Internet Protocol suite is defined by the Internet Engineering Task Force [IETF] standards body. The Internet is a global system of interconnected computer networks that use the standard Internet Protocol (IP) suite.

IP networks come in many forms; the most prevalent being Ethernet based wired IP networking. Ethernet is a family of computer networking technologies for local area networks (LANs) that is standardized as IEEE (Institute of Electrical and Electronics Engineers) Standard 802.3. In recent years with the prevalence of mobile computing devices, Wi-Fi has become the most popular means for connecting network devices wirelessly. Wi-Fi is a trademark of the Wi-Fi Alliance and a brand name for products using the IEEE 802.11 family of standards. A Wi-Fi network is a type of IP network.

The convenience and benefits of IP networking means that all of these media sources and playback systems, if not already network enabled, are becoming network enabled. Many Blu-ray players now have Ethernet and Wi-Fi network connectivity. Today most higher end TVs are smart TVs that have network capability. Similarly audio play back devices and even radios are network and Internet enabled.

Mobile devices, such as mobile phones, tablets, readers, notebooks etc, are able to receive and store media and have powerful media (audio and video) capabilities and are connected to the internet via cell phone data services or broadband links, such as Wi-Fi that are high bandwidth and can access online media services that have wide and deep content.

The use cases or applications of these various forms of digital media, media services and media sources and playback systems have been evolving. Initially it was enough to connect a media source to a media destination over an IP network. This is widely used today with Internet based media source services, such as Netflix and a computer as a media destination. Users watch Netflix movies streamed over a wired IP network (the internet) to a computer. This is a case of a single point (one IP source) to single point (one IP destination) connection over a wired IP network. Even though the Netflix media service may send the same media to multiple households, each of these is a single point to single point connection TCP/IP connection. A further evolution of this is to use a wireless, Wi-Fi connection, instead of a wired Ethernet connection. This is still a single point to single point connection.

The applications targeted in this invention are for a further extension of the above use cases where the media source connects to multiple destinations rather than a single destination. These are single point (one IP source) to multi point (multiple IP destinations) applications. An example would be where a user is playing a 5.1 movie media file to a wireless video playback device and 6 independent wireless audio destinations making up a full 5.1 surround sound system. In this case the media is going from one media source to 7 media destinations simultaneously. In another example, a user is playing music from one media source to 6 audio playback systems placed around the home in 6 different rooms.

In both of these cases, it is necessary to play (render) the media at all destinations time synchronously. Furthermore, it is necessary to limit the use of resources at the media source, such as keeping memory use to a minimum. In addition, it is necessary with multiple devices receiving media to manage network bandwidth efficiently.

In some applications, the video media may be rendered through one path, for example a specialized hardware path, and the audio may be rendered through a different network path. When different media components of the same media are going through different paths, it is necessary to keep path delays (path latency) to a minimum. This is necessary to keep the different media components time synchronized. In these applications, keeping media network transport latencies to a minimum is important.

Furthermore, when the network is Wi-Fi, network packet losses can be high and it is necessary to mitigate these in order to deliver uninterrupted playback.

The general structure of these application are that of multiple IP networked media source devices choosing, connecting and playing media to one or more IP networked media playback devices over an IP communication network.

SUMMARY OF THE INVENTION

A method for indirectly measuring the rendering clock and adjusting the rendering of a media rendering devices, where the media rendering device comprises a CPU with access to a CPU clock; and a media rendering subsystem, that renders media based on a rendering clock crystal that is not the CPU clock; and where the media rendering subsystem is coupled to the CPU and where the rendering subsystem receives media data blocks from the CPU at points of time; and where the CPU computes a virtual clock using (a) the size of the media data blocks (b) the number of media data blocks received over time and (c) the CPU clock increment since the last media data request.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
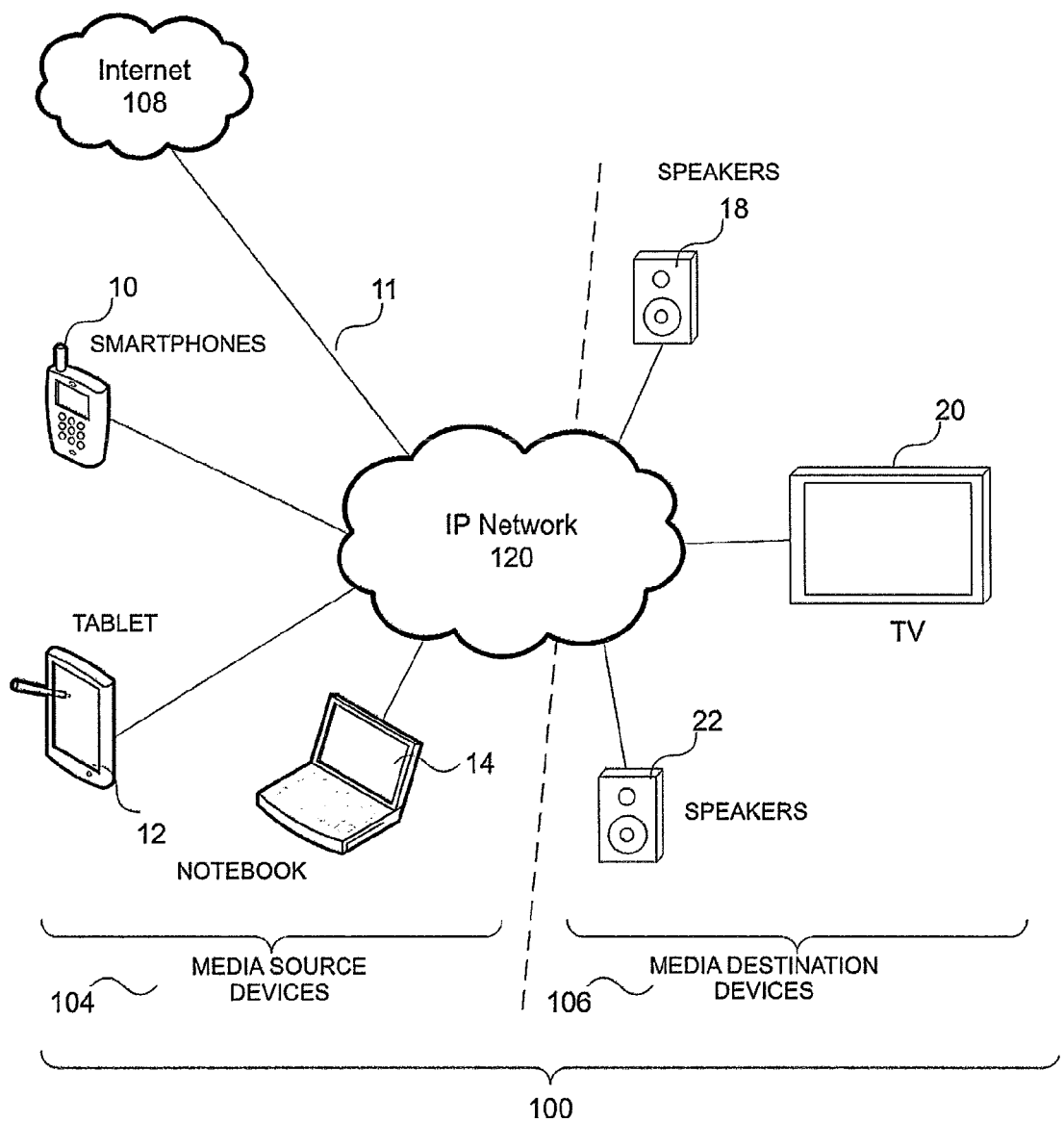
FIG. 1 is an illustration of an exemplary multimedia system comprising a plurality of media source and destination devices, according to an embodiment of the invention.

The inventor has conceived, and reduced to practice, a system and method for synchronized multimedia playback.
Hardware Architecture One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 15:
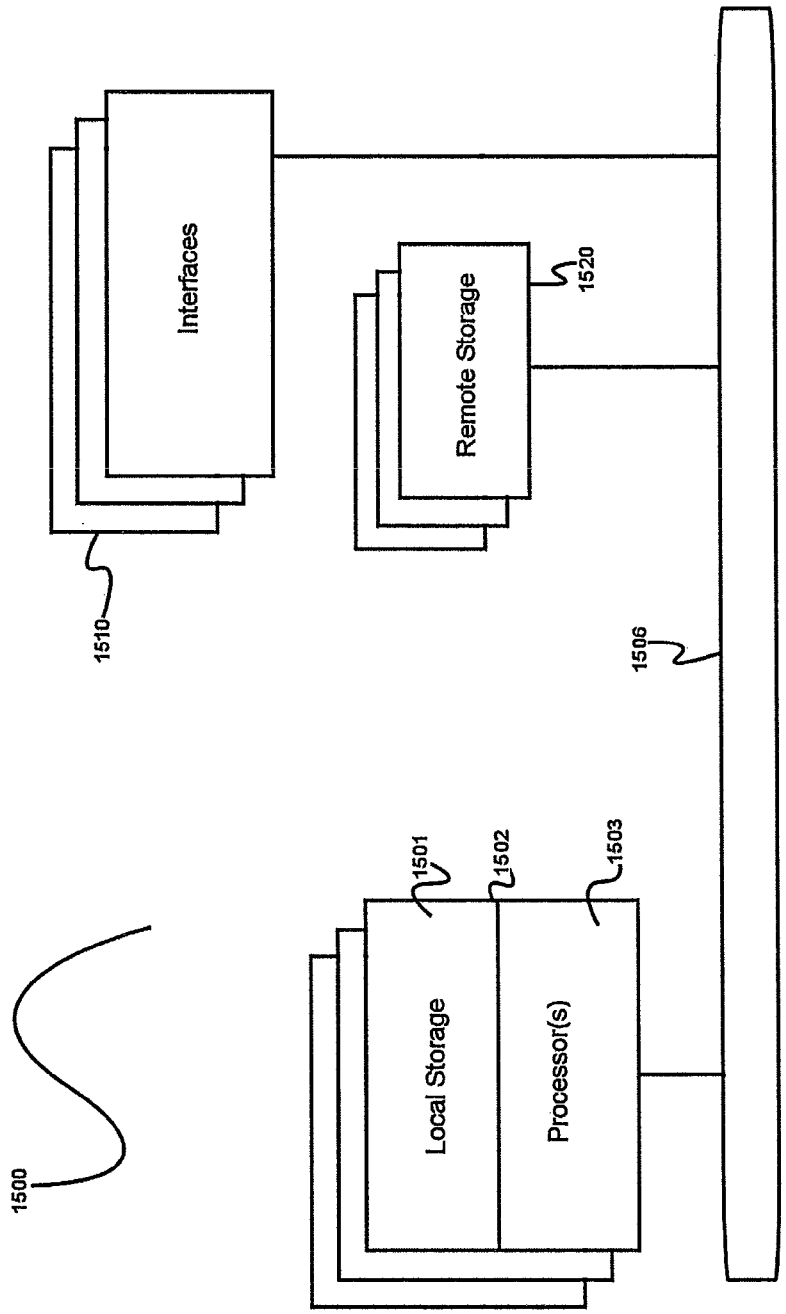
FIG. 15 is a block diagram illustrating an exemplary hardware architecture of a computing device used in an embodiment of the invention.

Referring now to FIG. 15, there is shown a block diagram depicting an exemplary computing device 1500 suitable for implementing at least a portion of the features or functionalities disclosed herein. Computing device 1500 may be, for example, any one of the computing machines listed in the previous paragraph, or indeed any other electronic device capable of executing software- or hardware-based instructions according to one or more programs stored in memory. Computing device 1500 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 1500 includes one or more central processing units (CPU) 1502, one or more interfaces 1510, and one or more busses 1506 (such as a peripheral component interconnect (PCI) bus). When acting under the control of appropriate software or firmware, CPU 1502 may be responsible for implementing specific functions associated with the functions of a specifically configured computing device or machine. For example, in at least one embodiment, a computing device 1500 may be configured or designed to function as a server system utilizing CPU 1502, local memory 1501 and/or remote memory 1520, and interface(s) 1510. In at least one embodiment, CPU 1502 may be caused to perform one or more of the different types of functions and/or operations under the control of software modules or components, which for example, may include an operating system and any appropriate applications software, drivers, and the like.

CPU 1502 may include one or more processors 1503 such as, for example, a processor from one of the Intel, ARM, Qualcomm, and AMD families of microprocessors. In some embodiments, processors 1503 may include specially designed hardware such as application-specific integrated circuits (ASICs), electrically erasable programmable read-only memories (EEPROMs), field-programmable gate arrays (FPGAs), and so forth, for controlling operations of computing device 1500. In a specific embodiment, a local memory 1501 (such as non-volatile random access memory (RAM) and/or read-only memory (ROM), including for example one or more levels of cached memory) may also form part of CPU 1502. However, there are many different ways in which memory may be coupled to system 1500. Memory 1501 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 1510 are provided as network interface cards (NICs). Generally, NICs control the sending and receiving of data packets over a computer network; other types of interfaces 1510 may for example support other peripherals used with computing device 1500. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 1510 may include ports appropriate for communication with appropriate media. In some cases, they may also include an independent processor and, in some in stances, volatile and/or non-volatile memory (e.g., RAM).

Although the system shown in FIG. 15 illustrates one specific architecture for a computing device 1500 for implementing one or more of the inventions described herein, it is by no means the only device architecture on which at least a portion of the features and techniques described herein may be implemented. For example, architectures having one or any number of processors 1503 may be used, and such processors 1503 may be present in a single device or distributed among any number of devices. In one embodiment, a single processor 1503 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 1520 and local memory 1501) configured to store data, program instructions for the general-purpose network operations, or other information relating to the functionality of the embodiments described herein (or any combinations of the above). Program instructions may control execution of or comprise an operating system and/or one or more applications, for example. Memory 1520 or memories 1501, 1520 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 16:
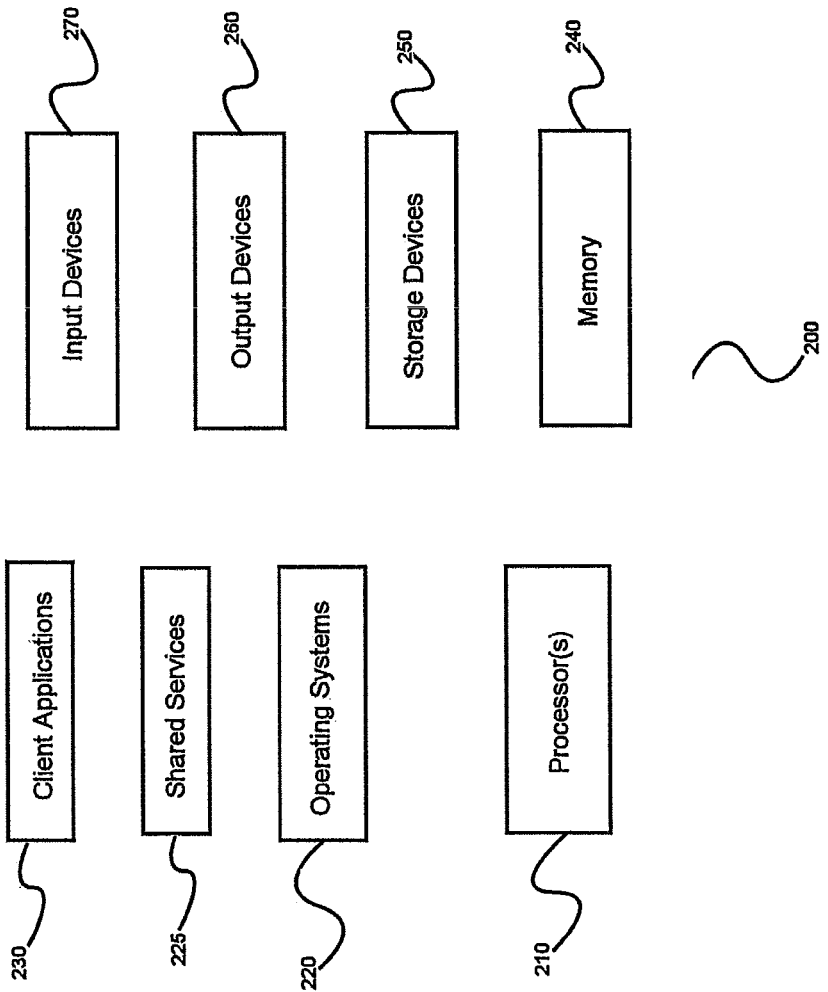
FIG. 16 is a block diagram illustrating an exemplary logical architecture for a client device, according to an embodiment of the invention.

In some embodiments, systems according to the present invention may be implemented on a standalone computing system. Referring now to FIG. 16, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 17:
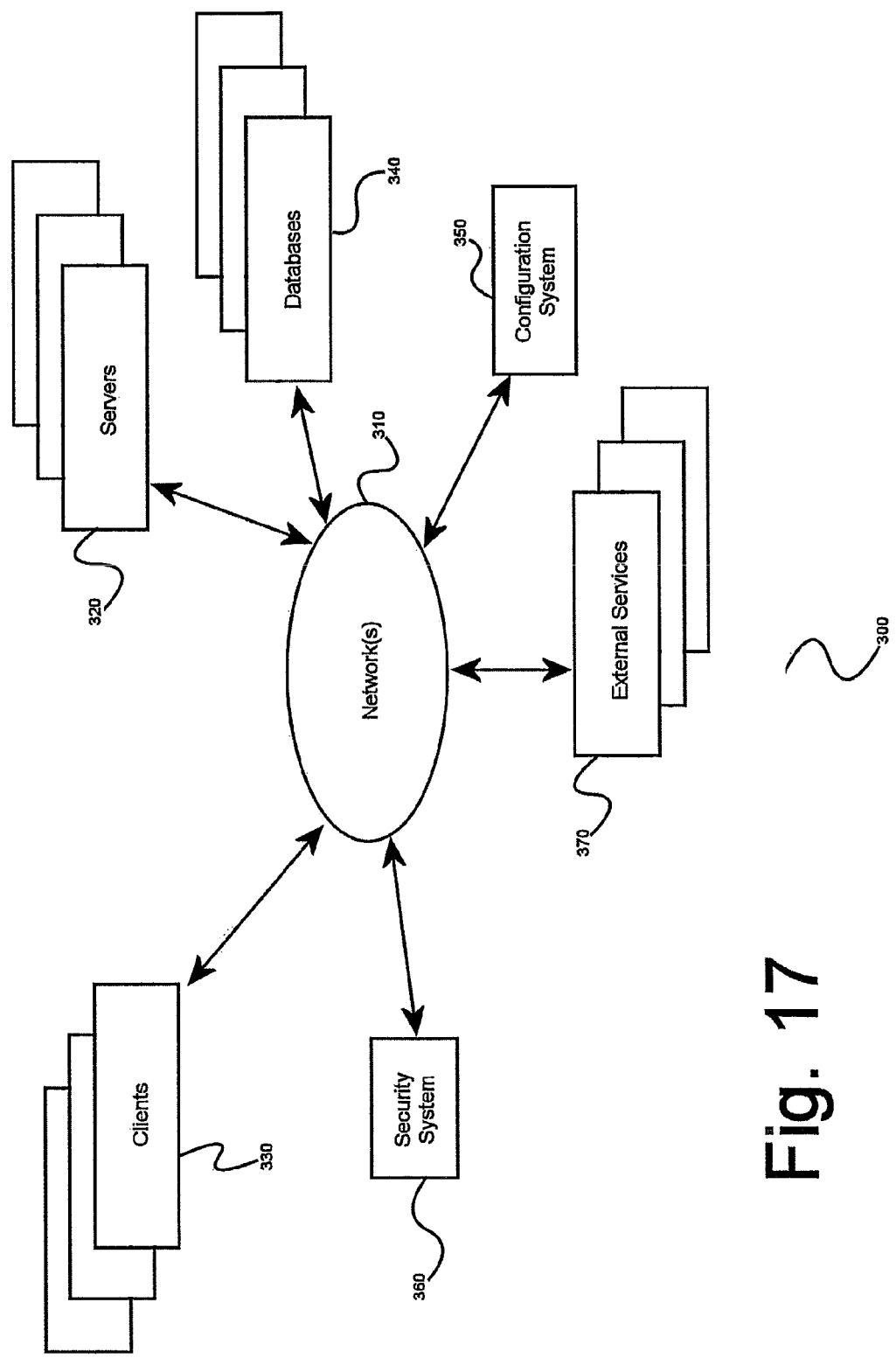
FIG. 17 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 17, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 16. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 18:
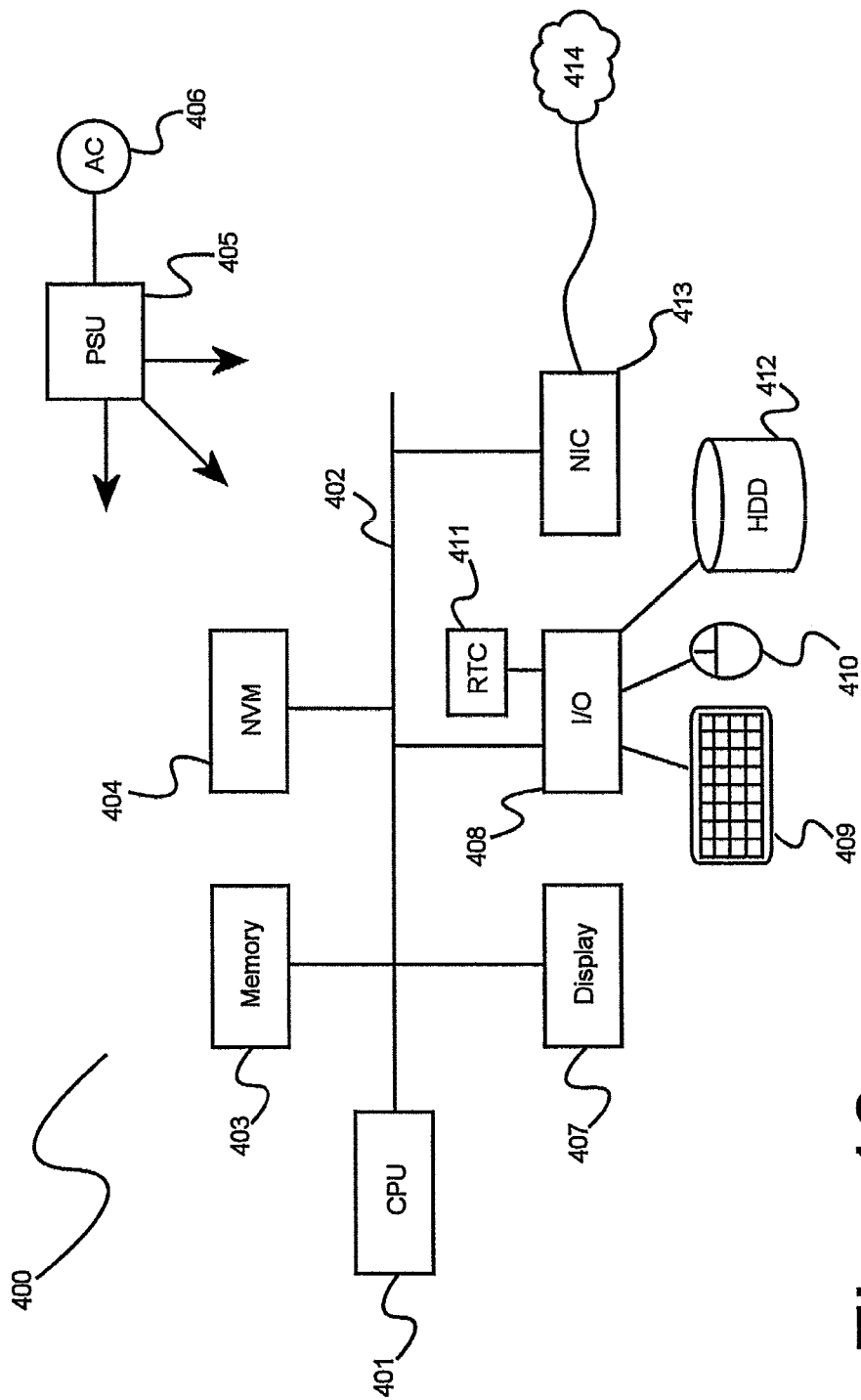
FIG. 18 is another block diagram illustrating an exemplary hardware architecture of a computing device used in various embodiments of the invention.

FIG. 18 shows an exemplary overview of a computer system 400 as may be used in any of the various locations throughout the system. It is exemplary of any computer that may execute code to process data. Various modifications and changes may be made to computer system 800 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

FIG. 1 shows an exemplary system 100 having multiple media source devices 104 and multiple media destination devices 106.

Figure 2:
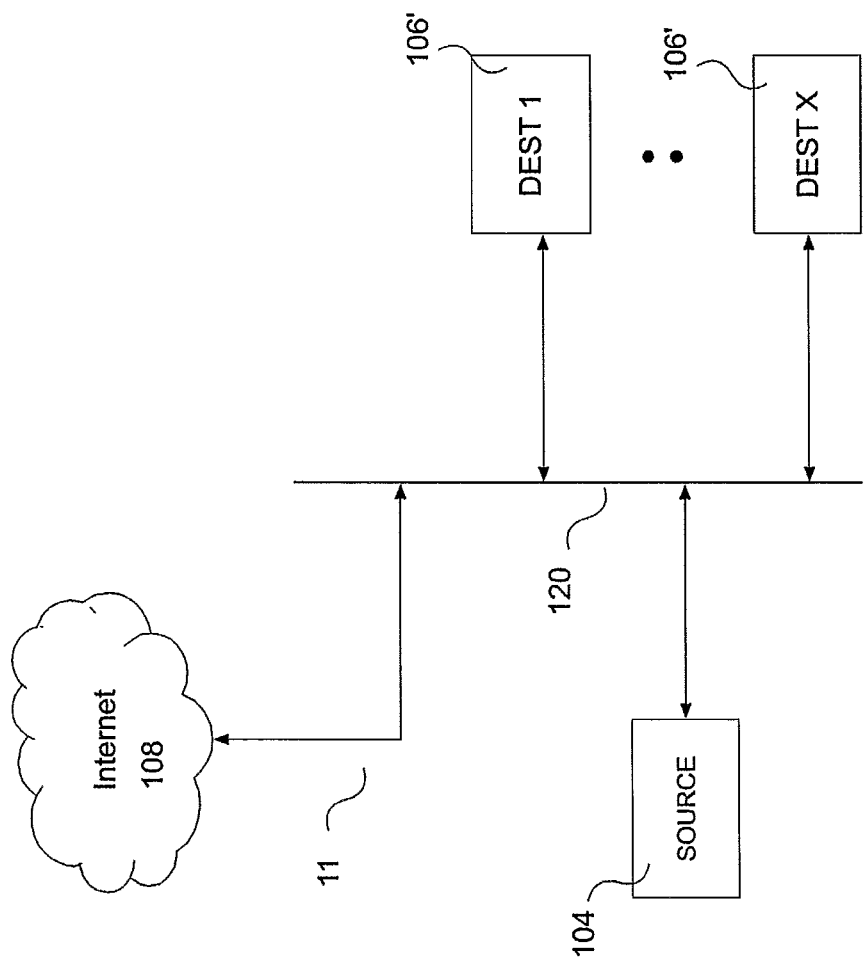
FIG. 2 is an illustration of an exemplary multimedia system comprising a plurality of IP-enabled media source and destination devices, according to an embodiment of the invention.

FIG. 2 is a schematic diagram of such a media system 100 with one or more IP network-enabled media source devices 104 and one or more IP network enabled media destination devices 106 connected via an IP network 120.

Referring to both FIG. 1 and FIG. 2, a media source device 104 can be any variety of computing devices that can originate digital media including computers (e.g. desktop, notebook 14, tablet 12, handheld), mobile devices (e.g. smart phone 10, electronic book reader, organizer devices), as well as set-top boxes and game machines 16. The media is any form of digital media, including audio or video, images, data, and/or Meta data.

Media destination devices 106 are devices that can receive digital media over an IP network 120 and play this media. This includes IP-enabled audio and/or video and/or imaging devices that can render audio or video or images or combinations of these at the same time. Media destination devices 106 include computers (e.g. desktop, notebook 15, tablet 13, handheld), mobile devices (e.g. smartphones, tablets, notebooks 15), network enabled TVs 20, network enabled audio devices 18, 22. If the media is audio, playing the media means rendering the audio such that a user can listen to the audio. If the media is video, playing means rendering the video such that a user can view the media. If the media includes both audio and video, it means rendering both the audio and the video. If the media is images, playing means displaying these images on a screen. In this description, media destination devices 106 may also be referred to as media renderers or combinations of these terms.

In the media environment 100 of the present invention, each media source 104 can send its media to a selected set of media destination devices 106 for playback.

The network 120 and all networks used and described in this invention to connect all devices, including the media sources 104 with the media destinations 106 may be any network that supports an IP protocol. This includes any wired IP connectivity mechanism including Ethernet if wired and if wireless it includes any wireless IP connectivity mechanism including Wi-Fi. If this 120 is a Wi-Fi network, then the network 120 may include a Wi-Fi access point (AP) or Wi-Fi router 110 that manages the network in infrastructure mode. Alternatively, the network 120 may be using Wi-Fi Direct (Wi-Fi Direct is a standard of the Wi-Fi Alliance), in which case the AP 110 may not be present. The IP network 120 may also be connected to the internet 800 through a wide area network connection 26. The source 104 may also have a remote device 114 associated with it such as a remote control device connected via an IP or other communication link 116. In addition the source 104 or network 120 may have additional optional devices 112 such as a NAS (Network Attached Storage) device that provides media.

IP networks can use several different types of messaging including unicast, multicast and broadcast messaging. Messaging being the sending of IP packets.

Unicast messaging is a type of Internet Protocol transmission in which information is sent from only one sender to only one receiver. In other words, Unicast transmission is a one-to-one node transmission between two nodes only. In unicasting each outgoing packet has a unicast destination address, which means it is destined for a particular destination that has that address. All other destinations that may hear that packet ignore the packet, if the packet's destination address is not the same as that destination's address. Broadcast is a type of Internet Protocol transmission in which information is sent from just one computer, but is received by all the computers connected on the network. This would mean that every time a computer or a node transmits a 'Broadcast' packet, all the other computers can receive that information packet. Multicast is a type of Internet Protocol transmission or communication in which there may be more than one sender and the information sent is meant for a set of receivers that have joined a multicast group, the set of receivers possibly being a subset of all the receivers. In multicasting, each multicast packet is addressed to a multicast address. This address is a group address. Any destination can subscribe to the address and therefore can listen and receive packets sent to the multicast address that it subscribed to. The benefit of multicasting is that a single multicast packet sent can be received by multiple destinations. This saves network traffic if the same packet needs to be sent to multiple destinations. When the same data needs to be sent to multiple IP destinations generally, Broadcasting or Multicasting, rather than Unicasting, provides the most efficient use of the network.

In this description the terms Broadcast and Multicast may be used. In both Broadcasting and Multicasting, when messages are sent, they are received by multiple destinations. Therefore in the present specification, the terms Broadcast and Multicast may be used interchangeably to refer to one packet being received by multiple destinations. In some cases this description only says the media is sent or transmitted without specifying whether it is broadcast, multicast or unicast. In this case, it means any one of these methods may be used for sending or transmitting the media.

In this description, the terms Message and Packet are often used and may be used interchangeably. A Packet is a data set to be sent or received on an Internet Protocol network. The Packet may or may not be the same as an 'Internet Protocol Packet'. A Message refers to the logical information contained in such a packet. In this description, the term Segment may also be used to refer to a data set. A data set is a set of bytes of data. Data may be any type of data, including media or control or informational data. In this description the term data and packet may also be used interchangeable depending on context. Packet refers to a data set and data refers to data in general.

Many IP protocols are accessed from software programs via a Socket application programming interface. This Socket interface is defined as part of the POSIX standard. POSIX is an acronym for "Portable Operating System Interface", which is a family of standards specified by the IEEE for maintaining compatibility between operating systems.

Currently when the same media data needs to be sent to multiple network destinations, the general technique for doing so is to use data multicasting to the multiple destinations that need to receive the data.

In such a system the media is multicast to all the destinations and it is up to each destination to attempt to render the media appropriately. If during rendering there is an error where a renderer does not receive new media data or does not receive it correctly, the renderer may render erroneous data and then attempt to recover and continue correct media rendering from the point after the error when correct data is received. For example, during rendering of a H264 stream, if there is an incidental data drop out, the displayed image may pixilate briefly and then recover.

In the applications envisioned here, there is a need to send media from a source to multiple media devices, such as TV and speakers in the same listening and viewing space. Furthermore there is a need to send this media over a wireless network such as Wi-Fi.

For these applications, this means all of the media rendering devices, such as speakers, that are in the same listening or viewing zone, need to be precisely synchronized to each other, so the listener and/or viewer does not discern any unintended media experience.

Secondly, because the media is transported over wireless, there is a very high likely hood of a media error, where the media is not received at each destination reliably or uniformly. If using broadcast or multicasts to send packets, the same broadcast or multi cast packet, may be received at one destination but not received/heard by another destination.

In this invention, in order to broadcast media over a Wi-Fi network, it is first necessary to recognize that broadcast or multicast media will not be received at all destinations uniformly. Some destinations will receive a multicast packet, while others will not.

IP networks were first designed to operate over wired networks. By design, the packet communications on these networks were 'best effort'. This means any packet transmitted on the network may not be received by the intended destination. This is most often due to a collision, where another device starts to communicate at the same moment as the device of interest, thereby causing a collision. Another method of loss would be the devices in the network path, such as routers, simply dropping the packet, for example due to the lack of buffer space. Other reasons for loss could be that the wired line is simply noisy and the packet transmission got corrupted, though this is rare for the wired case vs. the wireless case.

In all these wired situations, it is generally the case, that if the transmission, for example a multicast message, was received by one device on a 'subnet' or wire, all the other devices on the same 'wire' or subnet also receive the transmission correctly. This is because in the wired case, the noise or interference situation of a device on one part of the wire is not so different from the noise situation at another part of the wire. If the wired devices are connected via a switch rather than a hub, the same issues are true, the amount of noise or interference is minimal.

In Wi-Fi the differences in receipt of Wi-Fi traffic at each Wi-Fi device in a subnet is substantial. Therefore it is necessary to account for this.

DETAILED DESCRIPTION OF EXEMPLARY EMBODIMENTS

Figure 3:
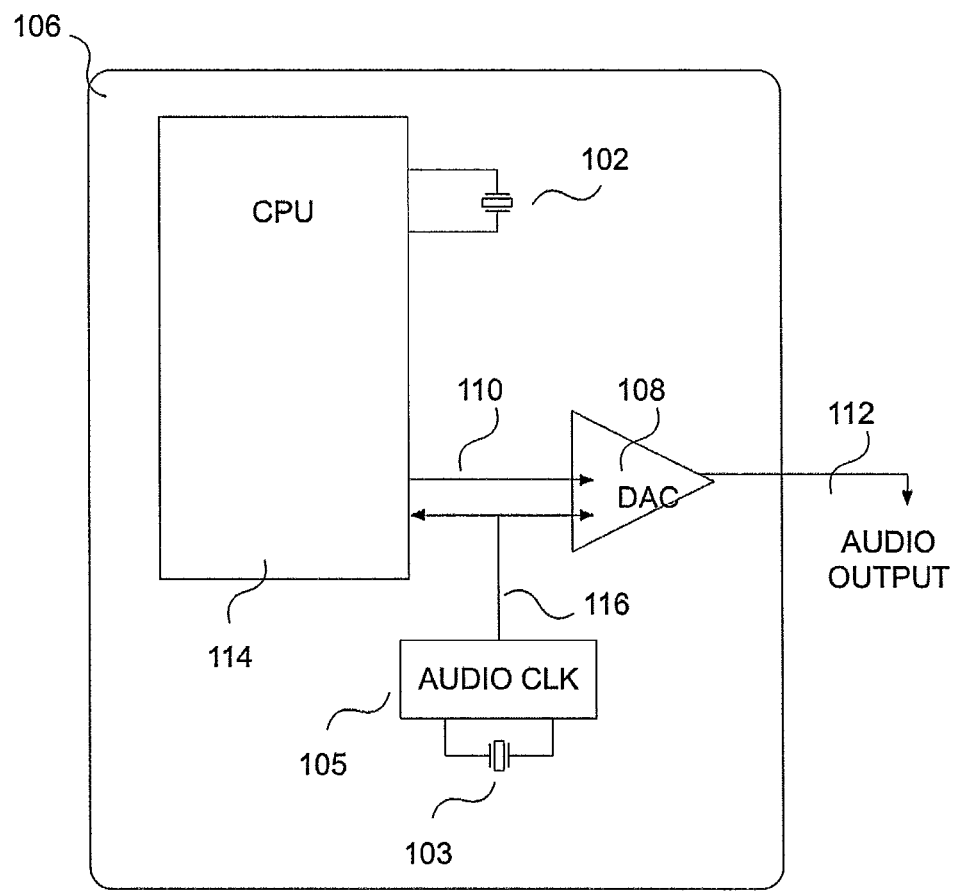
FIG. 3 is a detailed illustration of an exemplary audio playback system, according to an embodiment of the invention.

FIG. 3 shows a block diagram of a typical digital system 106 for playing audio. Such a system includes a Central Processing Unit (CPU) 114, a Digital to Analog Converter (DAC) 108 and a number of crystals and clocks, amongst other components and subsystems. For the purposes of this description the CPU block also includes RAM (Random Access Memory) and non-volatile memory and other peripherals and components typical of a CPU block. The DAC block also includes other components such as filters and amplifiers necessary to generate audio signal output. Modern CPU's, also referred to as "processors", 114 typically use a CPU clock to control and monitor CPU activity, which is usually based on a CPU crystal 102 as shown in this Figure.

Note the use of the word Clock in this document, refers to a device or mechanism that increments a counter or value at a certain rate, the clock rate. The counter value is also sometimes referred to as the clock value or clock. The clock rate is also referred to as clock frequency. The words clock rate and frequency are used interchangeably.

The crystal is driven by an oscillator circuit usually built into the CPU 114. The oscillator circuit uses the mechanical resonance of the crystal, a vibrating crystal of piezoelectric material, to create an electrical signal with a very precise frequency.

The frequency of the CPU crystal 102 and its properties are usually specified by the manufacturer of the CPU 114 and usually relate to the operating frequency of the CPU 114. The CPU crystal 102 frequency usually does not need to be very accurate. The CPU performance is very much dependent on the algorithm it is running and the stability and accuracy of a typical crystal is much more than is needed. In fact, in order to meet FCC (Federal Communication Commission) and CE (European Conformity) Electromagnetic radiation limits on some systems, the CPU clock frequency is intentionally spread over a wider band of frequencies which lowers the radiated emissions caused by the CPU clock at specific frequencies, by spreading this radiation energy over a wider frequency band.

The DAC 108 converts digital audio samples into an analog signal output 112.

The audio samples (media data) come to the DAC 108 via digital signals 110 from the CPU 114. The rate at which the DAC 108 receives and converts the audio samples is usually controlled by a separate audio clock signal 116. This audio clock signal is generated by an audio clock circuit 105 that uses its own Audio crystal 103 to base its clock frequency on.

The audio crystal 103 is usually chosen based on the requirements of the audio sub system and DAC 108. Typically the audio crystal 103 frequency is chosen to be a multiple of the sample frequency of the audio samples that the DAC 108 is receiving. E.g. for a 44.1 KHz 16 bit stereo audio sample rate, the typically clock rate used is 11,289,600 MHz. This is because this is a simple multiple (256) of the 44.1 KHz sample rate.

Every crystal has specific performance characteristics with regard to its frequency accuracy, which depends on initial manufacturing tolerance, crystal loading, aging and temperature drift. The key factors in frequency accuracy are the initial manufacturing tolerances and temperature drift (frequency stability).

Crystal manufacturing tolerances are usually specified in Parts Per Million (PPM). So a crystal specified by the manufacturer as having +/−50 PPM, with a center frequency of 11,289,600 will have actual frequency in the range of 11,289, 600+/−564 Hz. Crystal temperature drift is usually specified as frequency temperature stability over a specified temperature range in PPM.

In audio applications, as the audio sample output rate depends on the audio crystal 103, the crystal 103 tolerance and frequency stability requirements are generally high. Any deviation of the crystal clock frequency will cause the audio samples to not be played at the proper sample rate, which will cause the tone of the audio to change.

For the reasons mentioned above, the CPU crystal 102 and the audio crystal 103 are rarely the same. The crystal frequencies needed are very different and the frequency stability required is very different.

Note that while this figure shows the use of crystals, oscillators may also be used. Oscillators are electronic components that also provide a clock signal. They usually consist of both a crystal and the oscillator circuit that drives the crystal in one package. The same issues mentioned above apply to the oscillator as it does to the crystal, though oscillators can be more precise. The following discussion, while referring to crystals, applies equally to the use of Oscillators instead.

Figure 4:
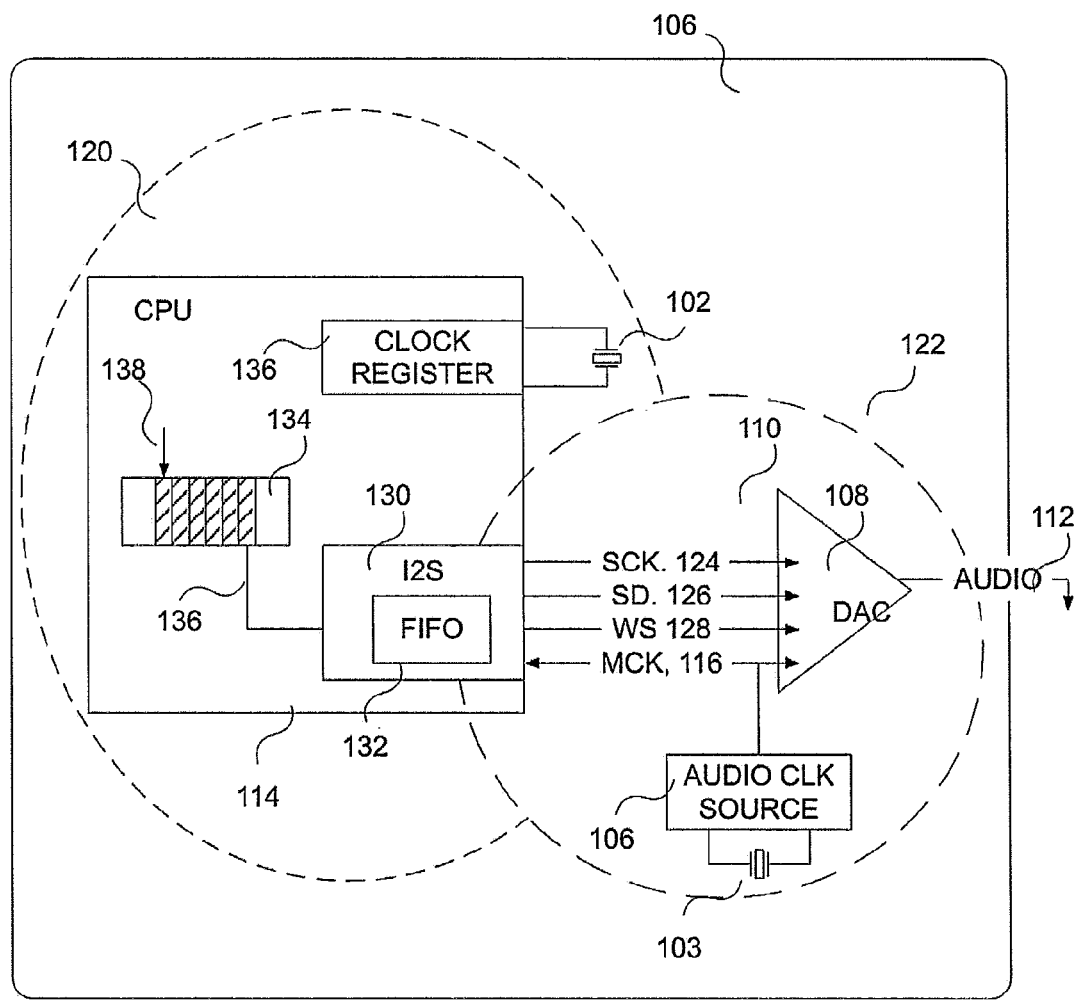
FIG. 4 is a detailed illustration of an exemplary audio playback system, according to an embodiment of the invention.

FIG. 4 shows more detail on the system shown in FIGS. 1-3. The CPU crystal 102 on a typical CPU 114 will be the basis of the CPU clock generated internally by the CPU 114. The CPU clock will then be used for all CPU timing activity. Some CPU's may generate many different clock signals internal to the CPU 114, based on this CPU clock. The CPU 114 may also have many clock peripherals and clock registers 136, based on the CPU clock that can be used for various timing related activities. For example a clock peripheral may be configured to interrupt the CPU periodically every 100 milliseconds. Since this clock is based originally on the CPU crystal 102, the accuracy of this period will depend on the accuracy of the CPU crystal 102. Typically a program running on the CPU 114 can also read a clock register 136 which will show the number of clock counts the CPU 114 has counted since the CPU 114 was powered up and reset. These clock counts will increment at a rate that is related to the CPU crystal 102.

The DAC 108 can be driven by the CPU 114 in a variety of ways. One of the most common approaches used is Integrated Interchip Sound (I2S or IIS). I2S is an electrical serial bus interface standard (See the "Philips Semiconductor I2S bus specification 1996") used for connecting digital audio devices together. Philips Semiconductor is a trademark of NXP Semiconductors N.V. The I2S bus separates clock and data signals, resulting in a very low jitter connection.

A typical CPU 114 will contain an I2S peripheral device 130 that can drive I2S-compatible devices that are external to the CPU 114, such as an external DAC 108. The I2S device is usually fed audio sample data from a memory buffer 134. The data given to the I2S device is usually placed in a First In First Out (FIFO) 132 buffer waiting to be sent to the DAC. The oldest audio sample in the FIFO 132 is serialized and sent to the DAC via the I2S signal lines 110. The I2S signal lines 110 usually consist of 3 signals. There is Shift Clock (SCK) 124 line, a Serial Data (SD) 126 line, a Word Select (WS) 128 line. The SCK 124 line clocks in data levels (high=1/low=0) on the SD 126 line into the receiving device. The WS 128 line selects the start of a new word. This may be high to denote the left sample data and low to denote the right sample data in a stereo I2S transfer. So for example if the sample data consists of stereo data with a word size of 16 bits, the WS 128 will be set high to indicate the left sample word and the SCK 124 and SD 126 lines will be used to clock a 16 bit left sample word to the DAC 108. The WS 128 line will then be set low, to denote the right sample word and then the SCK 124 and SD 126 lines will be used to clock a 16 bit right sample word to the DAC. The process is then repeated with WS 128 set back high to send out the next set of left and right audio data samples. All data on the SD 126 line is clocked into the DAC on the rising or falling edge of the clock line SCK 124. The Originator of the SCK 124 line therefore drives and controls the rate at which samples are clocked into the DAC 108 and the rate at which the DAC 108 output 112 is updated.

The SCK 124 is typically originated by the CPU 114, which also provides the audio sample data. However, this clock line SCK 124 is usually derived from another master clock line MCK 116. This master clock MCK 116 is derived from the audio clock source 105, which in turn is based on the audio crystal 103. This MCK 116 signal may also be provided to the DAC 108 which may be used for its operation. This means that even though the SCK 124 signal originates from the CPU 114 it is based on an external signal MCK 116 coming from a device external to the CPU 114.

The CPU clock crystal 102 is usually not used to derive the MCK 116 and SCK 124 clocks, for the reasons mentioned previously.

In a system such as this there are at least two clock domains related to audio sample data movement. The first clock domain 120 is the CPU crystal 102, and the derived CPU clock, base clock domain. This domain controls the CPU instruction execution rate and any clock based timing activity. The Second clock domain 122 is the DAC sample output clock domain, referred to here as the rendering clock domain. This clock domain is driven originally by the audio crystal 103.

Figure 5:
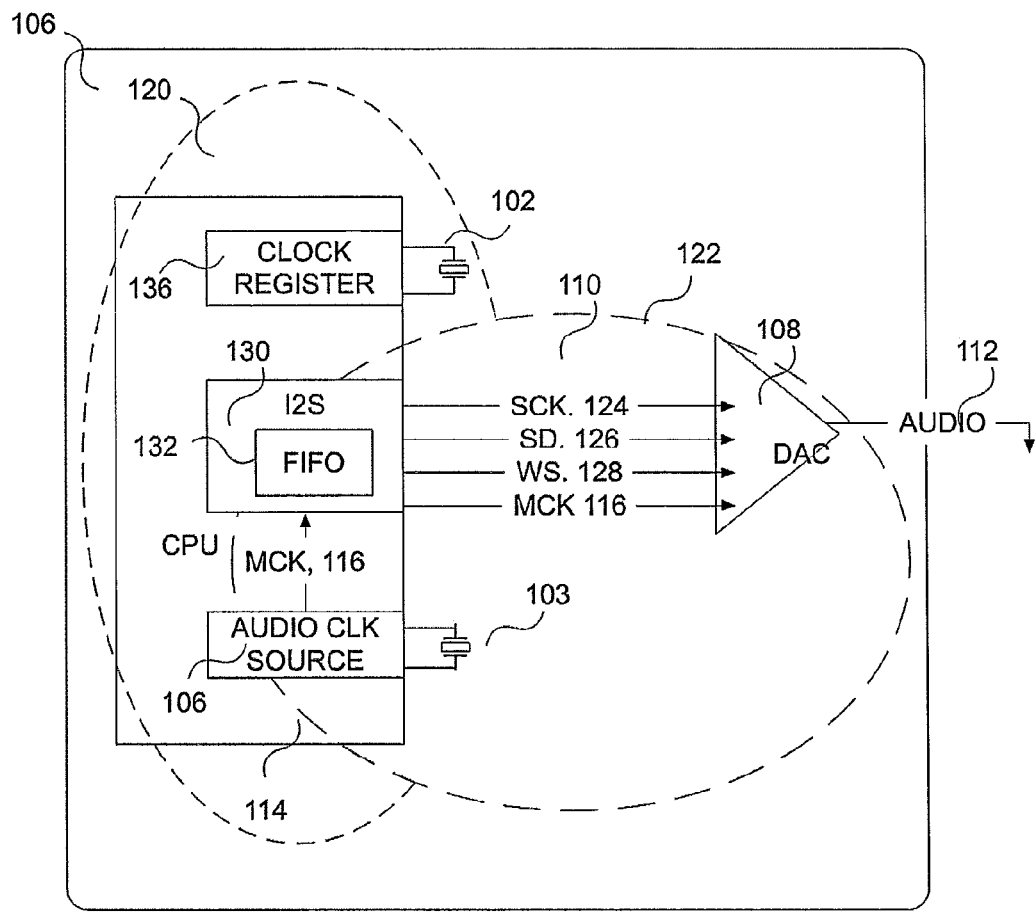
FIG. 5 is an illustration of an exemplary clock-based system for time referencing, to an embodiment of the invention.

FIG. 5 shows an alternative system to that shown in FIG. 4. In this system the audio clock source logic 105 is built into the CPU 114. This means the audio crystal 103 is connected directly to the CPU 114. Even though the audio clock source logic 105 is built into the CPU 114 this design is similar to the previous in that the I2S 130 clock source is MCK 116 from the audio clock source 105. Again there are two clock domains, the audio crystal 103 based DAC rendering clock domain 122 and the CPU clock crystal 102 based CPU clock domain 120.

These architectures show how a DAC is fed audio sample data from a CPU in a typical digital audio system. There are other designs that use other transfer mechanisms from the CPU 114 to the DAC 108 using mechanisms other than I2S. There are many types of Digital Serial transfer mechanisms and there are parallel mechanisms. In most of these cases however, the DAC data feed and output sample clock source, the rendering clock 103 is different from the CPU clock source 102.

There are a number of mechanisms by which audio sample data may be provided to the I2S or other such device to be sent to the DAC. The CPU may continuously poll the I2S to determine whether it is ready to accept another sample of audio data, and if so, provide that sample. The I2S may also be configured to raise an interrupt request (IRQ) to notify the CPU that it is in need of data and allow the CPU to respond accordingly. Perhaps the most common configuration, however, is to configure a direct memory access (DMA) peripheral, to respond to requests from the I2S peripheral. The DMA feed mechanism is chosen here as a typical approach used in this invention, but the principles covered below apply equally to any such mechanism by which audio sample data is fed to a DAC.

Figure 6:
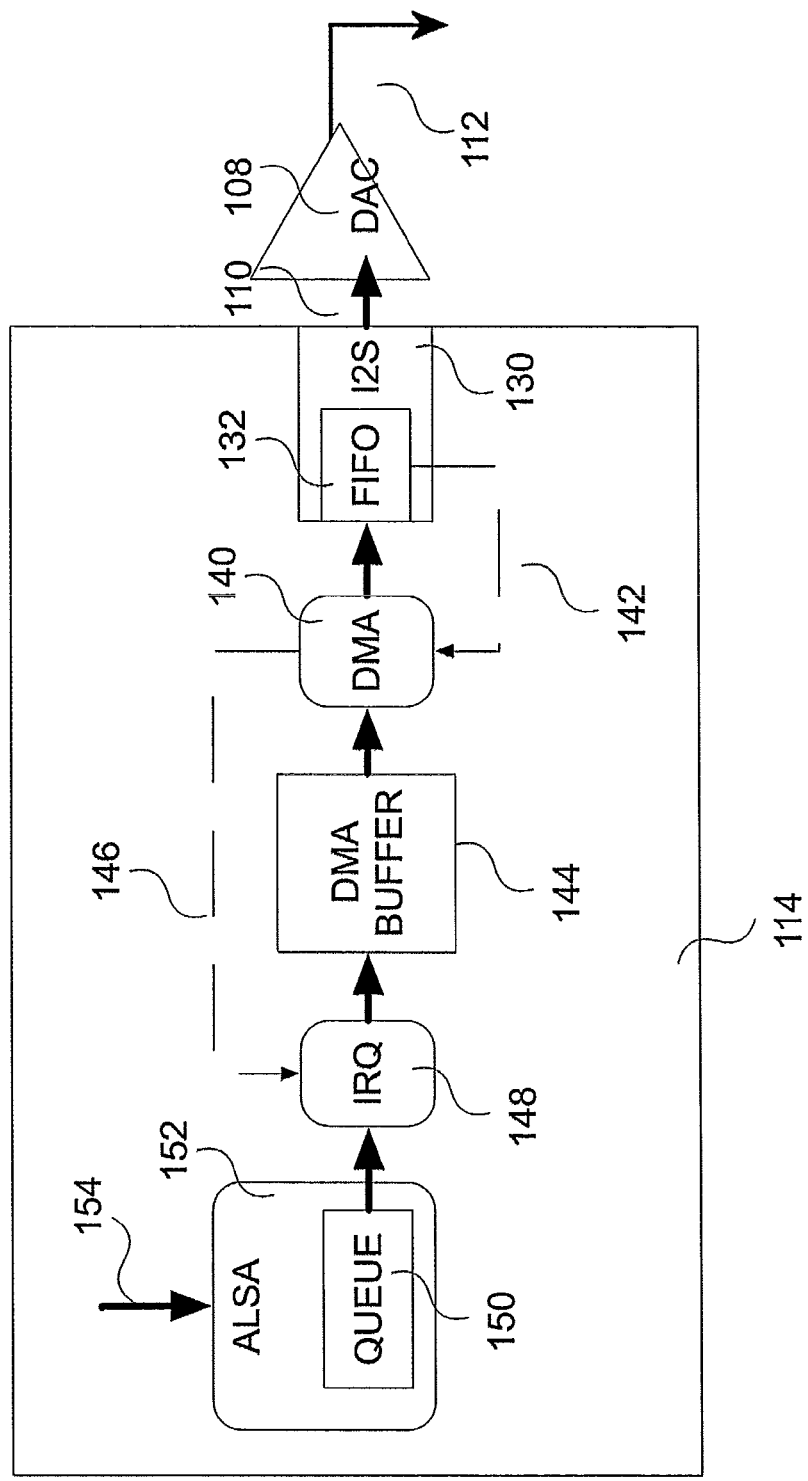
FIG. 6 is an illustration of an exemplary message timeline, according to an embodiment of the invention.

FIG. 6 shows how the audio sample data is handled inside the CPU 114 in a typical digital audio system. In this example it is assumed the software running on the CPU 114 is Linux. Linux is a computer operating system. The defining component of Linux is the Linux kernel, an operating system kernel first released 5 Oct. 1991 by Linus Torvalds.

In a typical Linux system, audio media to be played is provided to the ALSA (Advanced Linux Sound Architecture) subsystem to be rendered. ALSA sets up a number of queues/buffers and peripherals (IRQ 148, DMA 140) and places the audio data to be rendered in these queues and buffers. The audio data is then moved from these queues and buffers into the I2S 130 FIFO 132 and onto the DAC 108, by the peripherals that ALSA setup. The best way to follow the data is from the DAC 108 backwards.

Audio sample words are shifted out to the DAC 108 using I2S lines 110 as described above, from the FIFO 132 in the I2S 130 peripheral device. As audio samples are taken out of the FIFO 132, to be sent to the DAC 108, the number of audio samples available in the FIFO 132 falls, until it reaches a "Direct Memory Access (DMA) request" minimum threshold level. When the number of audio samples falls to this level, the I2S 130 peripheral device is configured to make a DMA request 142 for more data from a DMA peripheral device 140. The DMA device 140 is configured to service the DMA request 142 by moving sample data from the DMA buffer 144, that it is configured to use, to the I2S 130 device FIFO 132. The effect of this is to fill the FIFO 132 with more audio sample data from the DMA buffer 144. Similarly, the DMA device 140, as it uses data from the DMA buffer 144 is configured to raise an interrupt 146 when the amount of audio sample data in the DMA buffer 144 gets low or drops to zero. The interrupt (IRQ) 146 will cause the IRQ device 148, which is configured to get data from a queue in memory 150, to get more audio sample data from the queue 150 and replenish the DMA buffers 144 with this data. The overall effect of this is that as audio sample data is used by the DAC 108, more audio data is pulled from the various buffers and queues in the system. This may be viewed as the DAC requesting data from the system or as the DAC being fed data, on request.

The ALSA subsystem 152 itself may receive 154 audio samples from any number of sources. Typically a media file is being accessed to play the media. The media file may be local to the digital audio system 106.

In a system such as those described above, see FIG. 4, the rendering clock 103 frequency may not be exactly what it is supposed to be. For example, if the audio samples were sampled at 44.1 KHz and the audio systems 106, DAC 108 outputs and updates the audio output 112 at a rate that is slightly different from 44.1 KHz, the tone of the audio output would be slightly off. The audio samples would have been sampled at 44.1 KHz based on a clock of the device that originally sampled or re-sampled the audio data. The DAC 108 audio output rate would be based on the rendering clock, which is based on the audio clock source 108 crystal 103.

Figure 7:
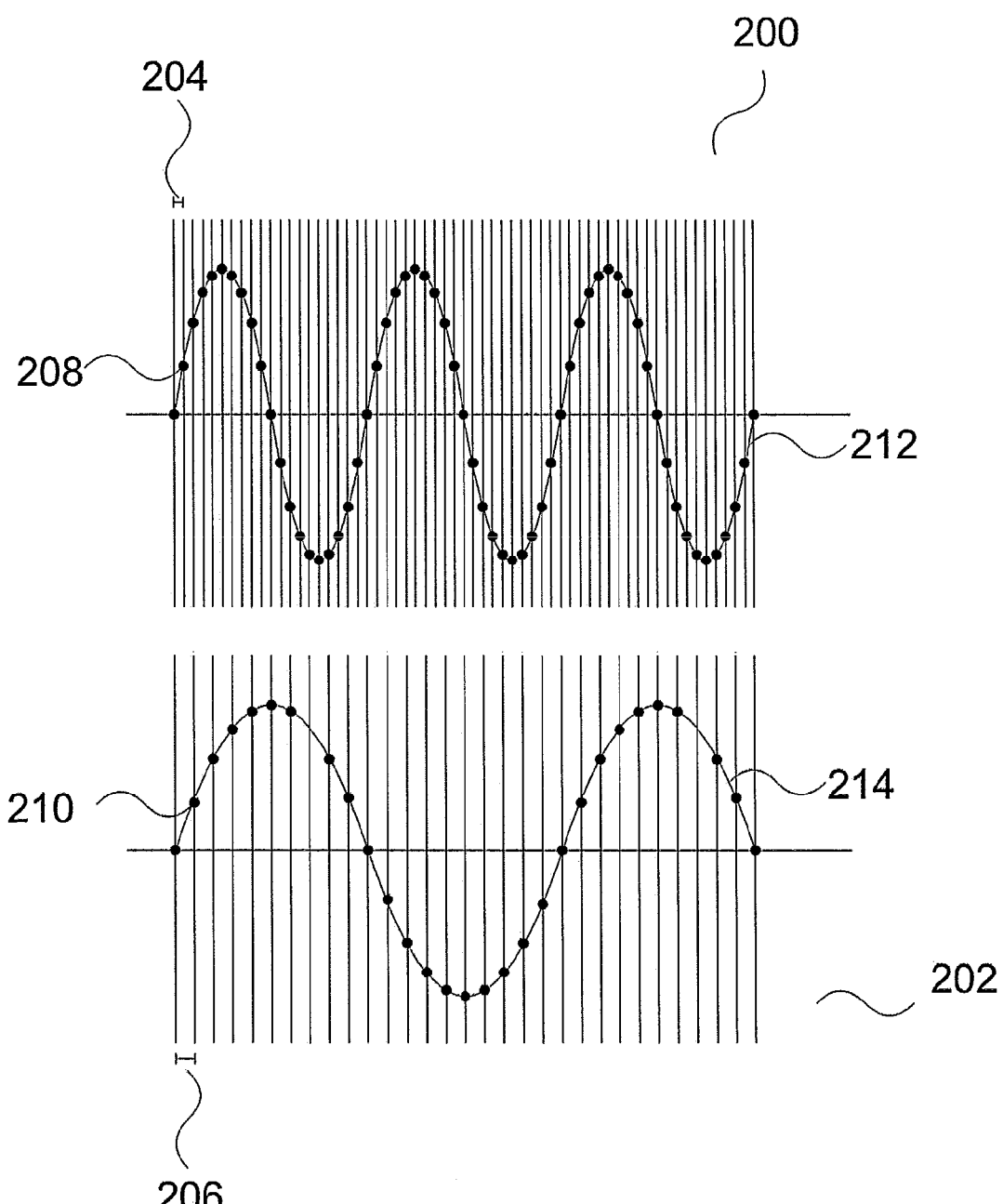
FIG. 7 is an illustration of the overall effect of using a common event-based system, according to an embodiment of the invention.

FIG. 7 shows an exaggerated diagram of such a difference between the rate at which the audio data was sampled and the rate at which the audio data is rendered. The upper part of the diagram 200 shows a wave form 212 with audio samples 208 sampled at a sample period 204 of period P. Say this is 44.1 KHz. The lower part of the diagram 202 shows the same audio samples 210 rendered at a sample period Pr 206 that is different from the original sampling period P 204. In this case the rendered waveform 214 will be different from the originally sampled wave form 212. If the rendering period 206 Pr is larger than the original sampling period P 204, then the rendered waveform 214 will have a longer period and lower frequency than the original waveform's 212 period and frequency.

If the rendering period Pr 206 is x % longer than the original period P 204, then the rendered waveform 214 will have a period that is x % longer and a frequency that is 1/x % of the original frequency. Furthermore if the original waveform 212 is a song that is 3 minutes long, and the rendering period Pr 206 is x % longer than the original period, then the rendered song will take 3 minutes*x % extra to finish. For a rendering period 206 that is based on a 50 PPM clock that is off by +50 PPM, means the rendering period is off by +0.005%. This means a 3 minute song would take 0.005% longer to finish. This is 60*3=180 secs*0.005%=approx 9 milliseconds longer.

When playing to a single audio device a frequency error of 0.005% represents a tone decrease of this percent which is negligible for most consumer grade products. In addition a play finish delay of 9 milliseconds in this example is also not a big issue.

Figure 8:
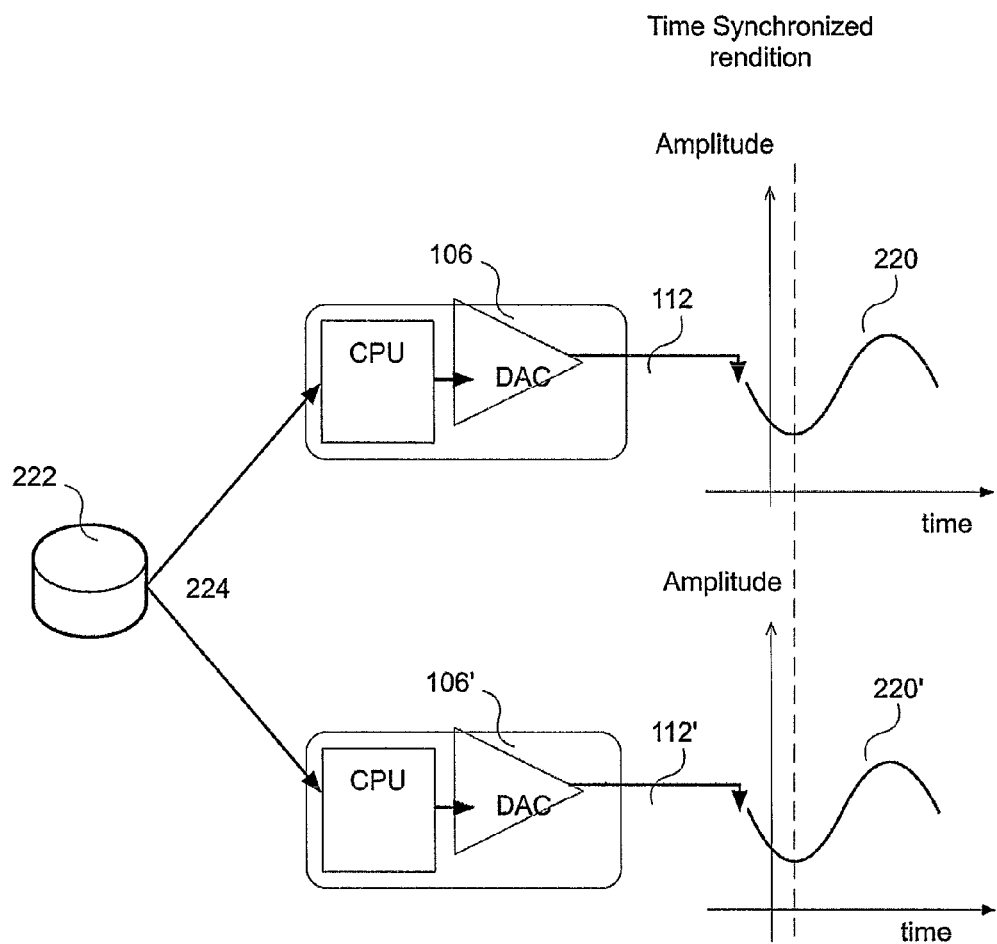
FIG. 8 is an illustration of an exemplary system architecture with two audio systems, according to an embodiment of the invention.

However, in the case shown in FIG. 8, when there are two digital audio subsystems, the issues mentioned above cannot be ignored. This FIG. 8 shows two digital audio subsystems, a first subsystem 106 and a second subsystem 106'. Both render the same audio data. For example each audio subsystem may be receiving the media from a file 222 on a network 224. Both audio systems 106 and 106', render the audio output 112 and 112' via their own respective DACs. In this case the rendered output waves 220 and 220' need to be in audio phase as shown in this figure. To be in audio phase, the rendered waves 220 and 220' need to have the same frequency and the same phase offset.

If they are not in phase, it means there is a frequency difference and therefore the user may hear a beat frequency that is related to the difference in frequency between the two waves 220 and 220'. Furthermore, over time, the two audio outputs will differ. So, in the example used previously, if the second subsystem 106' is off by +50 PPM, and the 3 minute song ends with a drum beat, the second subsystem 106' will play the final drum beat 9 milliseconds later than the first subsystem 106. After 10 such songs the difference will be 90 milliseconds, which will be very noticeable.

Therefore, when multiple audio devices 106 and 106' are playing the same media, it is necessary to adjust and ensure that the rendering clocks based on the audio crystal 103 on each system have the same phase offset and frequency.

Figure 9:
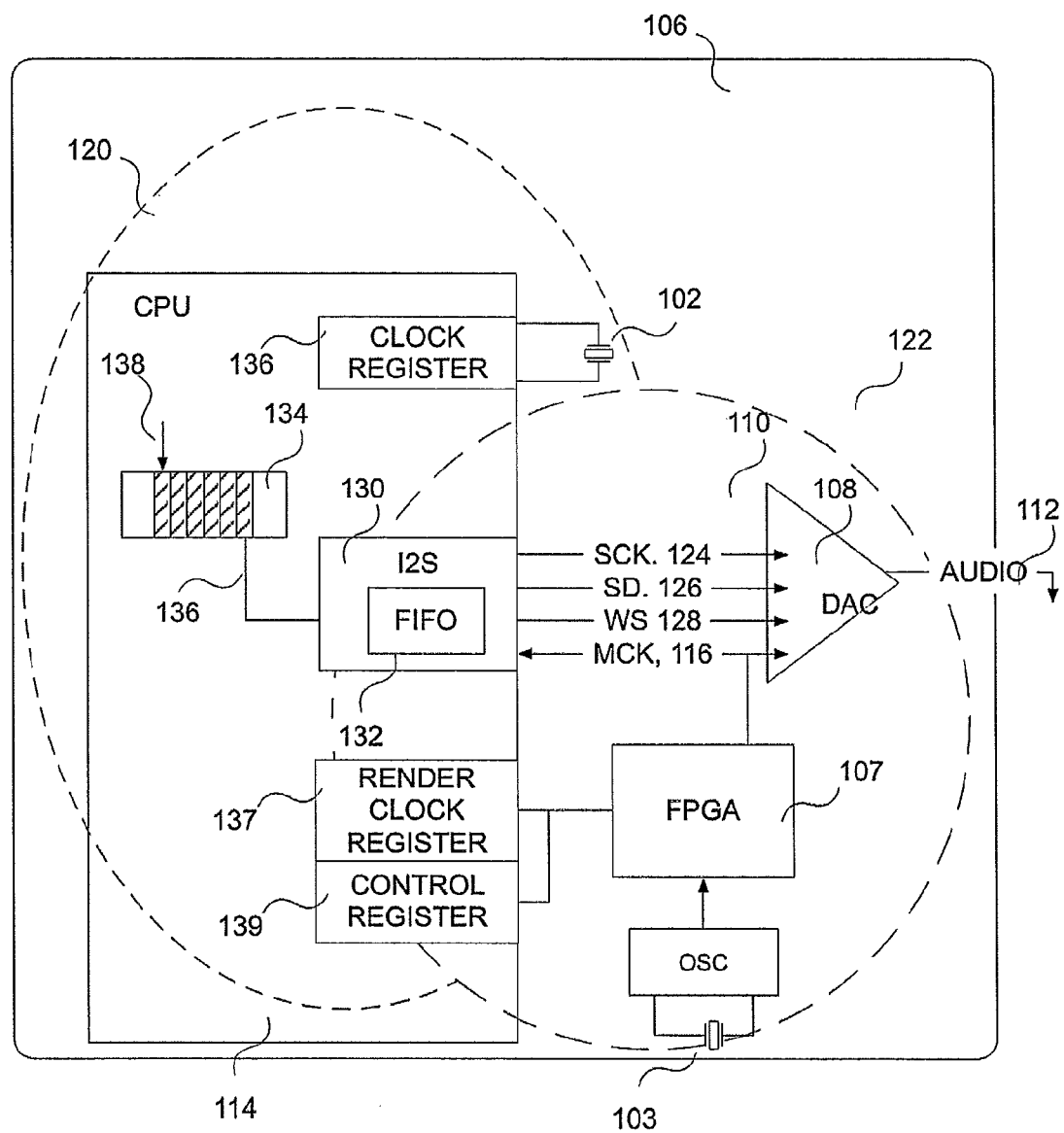
FIG. 9 is a detailed system architecture diagram of an embodiment of the invention.

FIG. 9 shows an approach to adjusting the rendering clock. In this case the rendering clock source is not taken directly from the audio crystal 103. Instead the audio crystal 103 is used to drive a special clock synthesizer subsystem 107 that creates a clock from the audio crystal 103. This clock created by the synthesizer drives the MCK 116 clock that drives the I2S 130 and DAC 108. The clock synthesizer synthesizes a clock at a specific clock frequency that is set by a program running on the CPU 114. The CPU may control the synthesizer via one or more control registers 139 and may be able to read the synthesizer clock count via a clock count register 137. Since the synthesizer clock is the rendering clock driving the DAC 108, these registers allow the CPU 114 to monitor and control the rendering clock.

In a configuration such as this, reading the rendering clock value is easy as all the program has to do is to read the render clock register 137 value and controlling the rendering clock is also easy as it can be done via a control register 139.

The system can cause the CPU 114 to read the rendering clock values 137 over a known interval of time to determine whether the rendering clock synthesizer 107 is fast or slow with respect to other rendering clock synthesizers 107 on other devices 106' (see FIG. 8). The system can then increase or reduce the rendering clock synthesizer frequency 107 to cause the rendering clock on one device 106 to be the same as the rendering clock on another device 106'.

Figure 10:
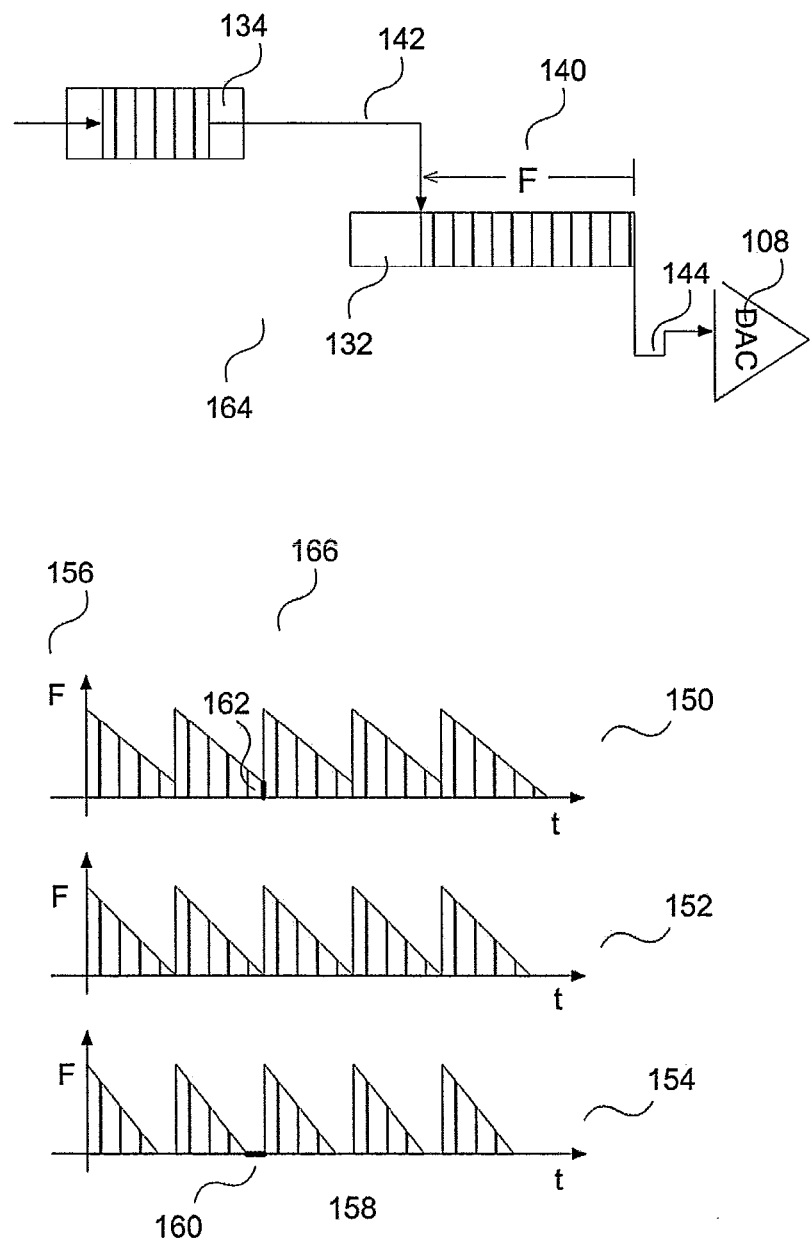
FIG. 10 is an illustration of the overall effect of using a common event-based system, according to an embodiment of the invention.

FIG. 10 shows an alternate approach that does not bother accounting for the differences in rendering clock and CPU clock. The upper part of this figure 164 shows a simplified block diagram of a DAC 108 being fed with data. In this case the DAC 108 is fed from an I2S FIFO 132 that is in turn fed with audio sample data from a memory buffer 134. Periodically the I2S FIFO 132 is loaded 142 with F 140 samples of data and these samples are removed 144 and loaded into the DAC 108 at a different period, which is the rendering period. The I2S FIFO 132 is loaded at a period based on the CPU or some other clock. The I2S FIFO 132 data is removed at a period based on the audio rendering clock.

If the rate at which data is loaded 142 into the I2S FIFO 132 is the same as the rate at which it is removed 144 from the I2S FIFO 132 then the I2S FIFO level F 140 will be as shown in the plot 152 shown in the lower half 166 of this figure. In these plots the vertical axis 156 represents the number of samples in the I2S FIFO 132 at time t, which is represented on the horizontal axis 158.

In plot 152, where the incoming and outgoing average rates are the same, just as the number of samples in the I2S FIFO 132 reaches zero, a new block of samples is put 142 into it.

In plot 154 the rate at which samples are removed 144 is faster than the rate at which samples are put into 142 the I2S FIFO 132. In this case, the FIFO 132 level will periodically fall to zero for a period of time 160, before a new set of samples arrive. This is a periodic "underflow" condition and means the audio samples are not represented accurately. When the I2S FIFO 132 underflows, the system may choose to have the DAC 108 output the last sample value that it received.

If the rate at which samples are removed 144 is slower than the rate at which it is put in 142 then the I2S FIFO 132 will eventually overflow. This is shown in plot 150. To accommodate this, a typical solution would be to flush the excess data 162 in the FIFO 132 whenever a new block of sample data is added. This again represents a distortion of the original sample data.

Such a system will certainly work, however is far from ideal. These underflows and overflows represent a deviation in rendering the audio from the correct rendition of the audio. Depending on the degree of underflows or overflows the user may hear these deviations as noise or distortions of the audio signal.

This invention is targeted at systems as shown in FIG. 8 where there are many individual devices 106, 106' rendering either the same or time related media and this media needs to be rendered synchronously and rendered as accurately as possible. Furthermore this invention is targeted at systems that do not include special hardware such as a clock synthesizer. This invention is targeted at systems that only provide a CPU and some sort of digital data feed to a DAC subsystem. In this case the actual rendering clock is not accessible in order to measure it and the rendering clock is not the same as the CPU clock. Examples of systems targeted by this invention are shown in FIG. 4 and FIG. 5.

The overall problem in these systems is firstly how to measure the rendering clock when there is no special hardware assistance to aid in reading and measuring the rendering clock. Secondly the problem is how to adjust the rendering of the samples, without something like a clock synthesizer, to account for differences in the rendering clock.

Referring back to FIG. 6, we observe that the FIFO 132 is fed by the DMA 140 and the DMA is fed by an IRQ 148. Audio Samples are being removed from the FIFO 132 at the audio clock rendering rate to be sent to the DAC 108. This means the FIFO 132 level is going to fall and hit the DMA request 142 level at a rate determined by the audio rendering clock. A DMA request 142 will fill the FIFO 132 with a fixed number of samples, which will then be subsequently removed from the FIFO 132 at the audio clock rendering rate, which will then cause the next DMA request 142. Therefore DMA requests 142 are going to occur at a rate that is related to and is a multiple of the audio clock rendering rate. Note, the actual timing of the DMA request is also subject to DMA hardware performance and timing issues, however these are orders of magnitude smaller than a typical audio rendering rate and are therefore negligible.

When the DMA buffer 144 gets low, it is going to make an IRQ request 146 for another block of sample data. The sample data in the buffer 144 is then going to be removed by DMA requests 142 at a rate related to the audio clock rendering rate as mentioned above. Once the DMA buffer 144 data gets low again it will make the next IRQ request 146. Therefore since the DMA request 142 are related to the audio clock rendering rate, the IRQ requests 146 are also related to it and are a multiple of the audio rendering clock rate. Again, note that while the exact time at which the IRQ request and services takes place is CPU program and clock dependent this is an order of magnitude faster than the audio rendering rate and so its effect is negligible.

Figure 11:
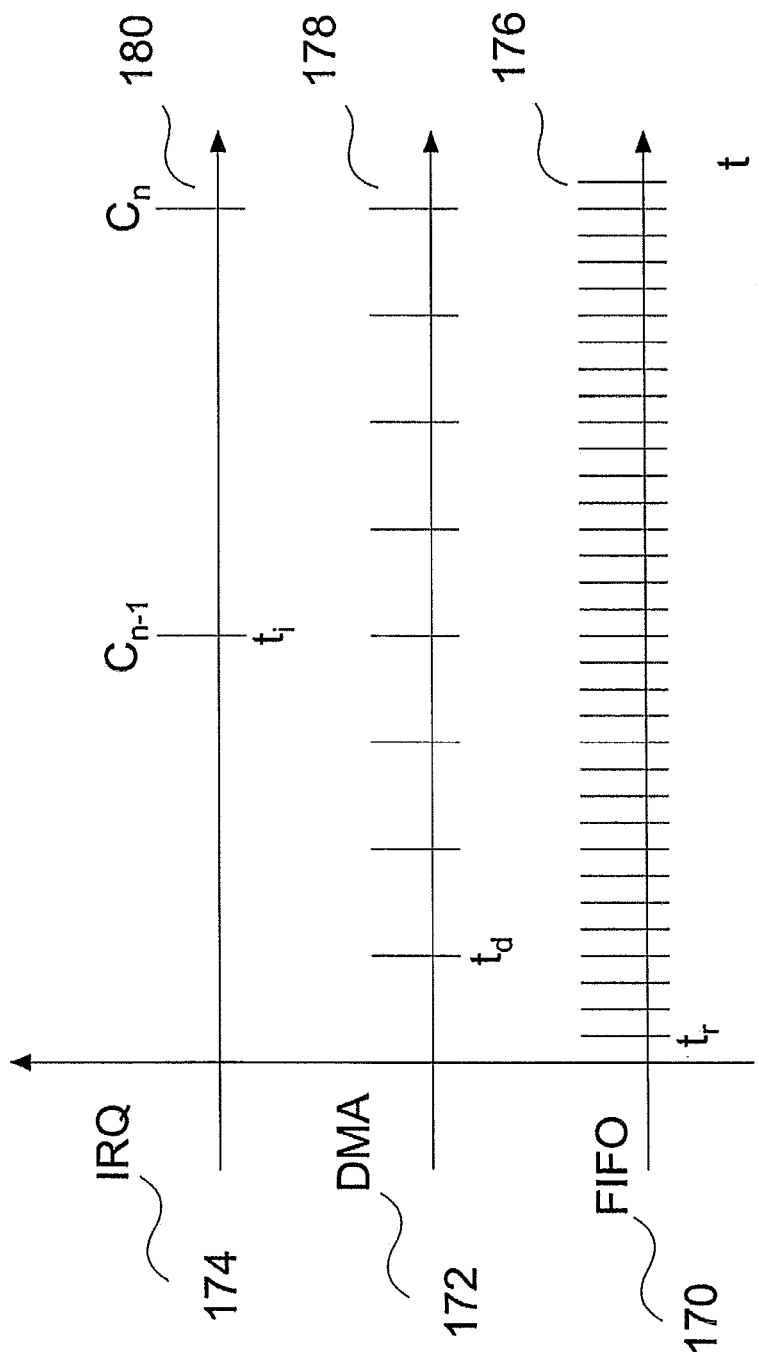
FIG. 11 is an illustration of the overall effect of using a common event-based algorithm, according to an embodiment of the invention.

FIG. 11 shows this in more detail. This show a plot 170 of the I2S sample data removal intervals 176, $t_r$. Above this, is a plot 172, of the DMA request 142, made at intervals 178, $t_d$. Lastly, at the top is shown a plot 174 of the IRQ requests 146 made at intervals 180, $t_i$. In this example it shows that each DMA request 142 provides 4 samples to the FIFO 132 and that IRQ requests 146 are made every 4 DMA requests 142. This means that IRQ requests 146 are made every 16 audio samples. I.e. an IRQ request 146 occurs after the removal of every 16 audio samples from the FIFO 132.

In general an IRQ request 146 will occur after the removal of every K block of samples. This means IRQ requests 146 are occurring at a rate of 1/K times the rendering clock rate. The value of K is fixed and determined by how the DMA 140 and IRQ peripherals 148 are configured.

Therefore a measure of the rate at which the IRQ requests 146 are made times K is a measure of the rate at which the rendering clock is changing.

This invention therefore solves the first problem of how to monitor and measure the frequency of an audio crystal 103 (see FIG. 4) that is external to the CPU, by recognizing that this crystal 103 is the basis of the rendering clock 116 used in the rendering subsystem 122, and that the rendering clock can be monitored and measured by measuring the rate at which sample data is fed to the DAC 108. Any drift in the audio crystal 103 will cause a corresponding drift in the rendering clock 116, which will in turn cause a drift in the rate at which sample data is fed to the DAC 108.

It is therefore possible to construct a virtual rendering clock counter by creating a value, BVRC (Block Virtual Rendering Clock Count), that is equal to the number of IRQ requests 146 times the value K.

Figure 12:
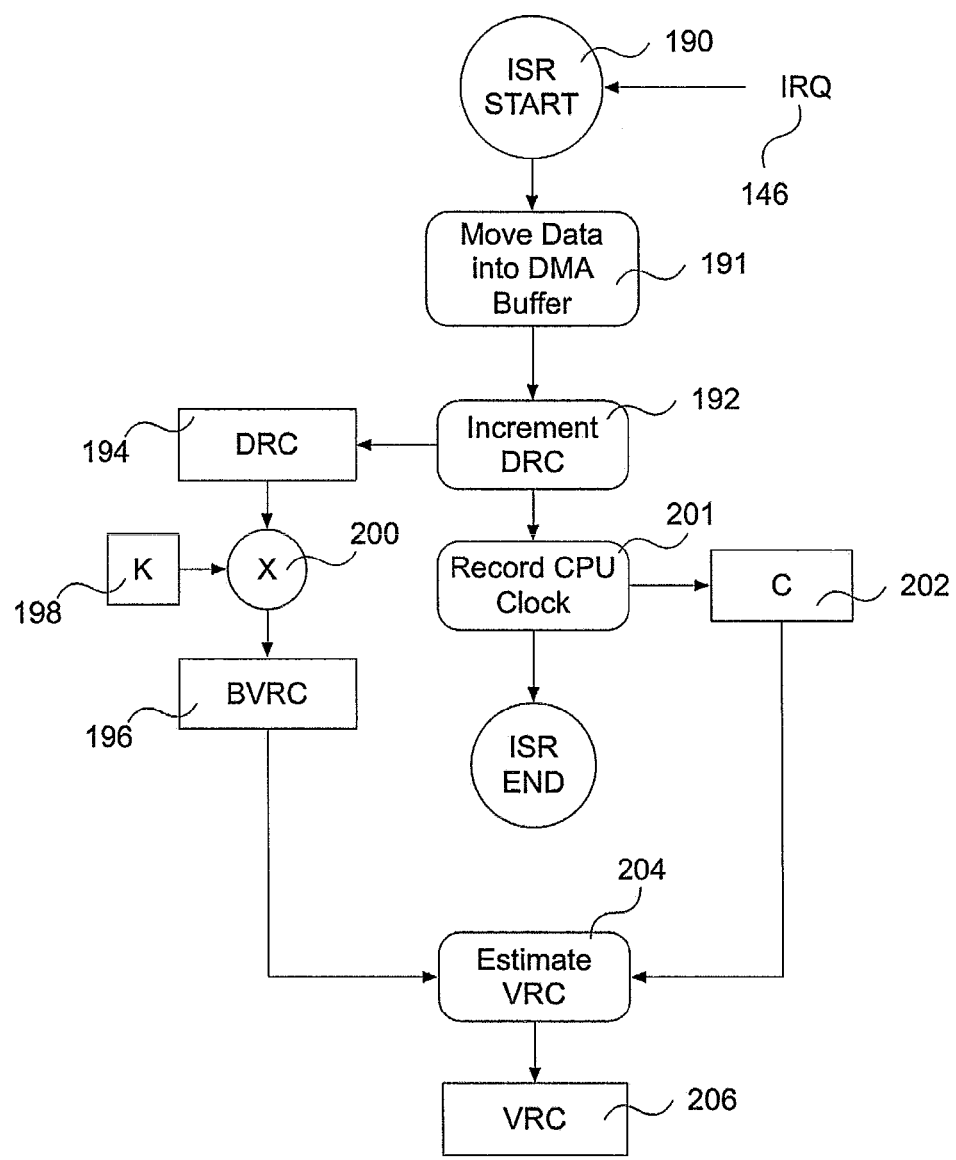
FIG. 12 is a process flow diagram for a clock adjustment method, according to an embodiment of the invention.

As shown in FIG. 12, the IRQ request 146 from the DMA 140, which request more data for the DMA peripheral 140, initiates 190, an Interrupt Service Routine (ISR). This ISR both moves 191 more data, a data block of size K, from a memory queue 150 into the DMA buffer 144 for the DMA 140 to use, and increments 192 a Data Request Counter (DRC) 194, that keeps track of the number of times a request for more data has been made.

This DRC 194 is then used, together with a preset value K 198, to construct a Block Virtual Rendering Clock Counter (BVRC) 196.

$$BVRC=DRC*K$$

This BVRC counter will only increment every time an IRQ request 146 is made and each time it does so it will increase by a value of K. So this BVRC counter will have a resolution of K samples.

If the rendering clock is set at 44.1 KHz, its period will be 22.6 uSecs and if K is 16 samples, the BVRC resolution will be 362.8 uSecs. In practice K may be much larger, say 1024 samples, making the BVRC resolution 23.2 milliseconds, which is a very low resolution.

What this means is that if an interval in time of N samples is measured with the BVRC, by taking a BVRC reading at the beginning of the interval and subtracting this value from a BVRC reading taken at the end of the interval, BVRC difference will be =N+/−K samples.

While this is a measure of the rendering clock, the low resolution, makes this non ideal for measuring the rendering clock to an adequate level of accuracy.

Therefore this invention uses a local CPU clock to perform inter block interpolation to estimate what the VRC should be at any particular moment. The local CPU clock is the clock used by the CPU, based on a crystal 102 (See FIG. 4), to time activity in the CPU. Typically this clock is used to increment a counter that is accessible via a clock register 136. This counter value continually increments every crystal clock cycle and reading this value provides a count of how many crystal clock cycle have passed, since the CPU was reset. The clock register 136 therefore is referred to as the local CPU clock counter in the description below.

Figure 13:
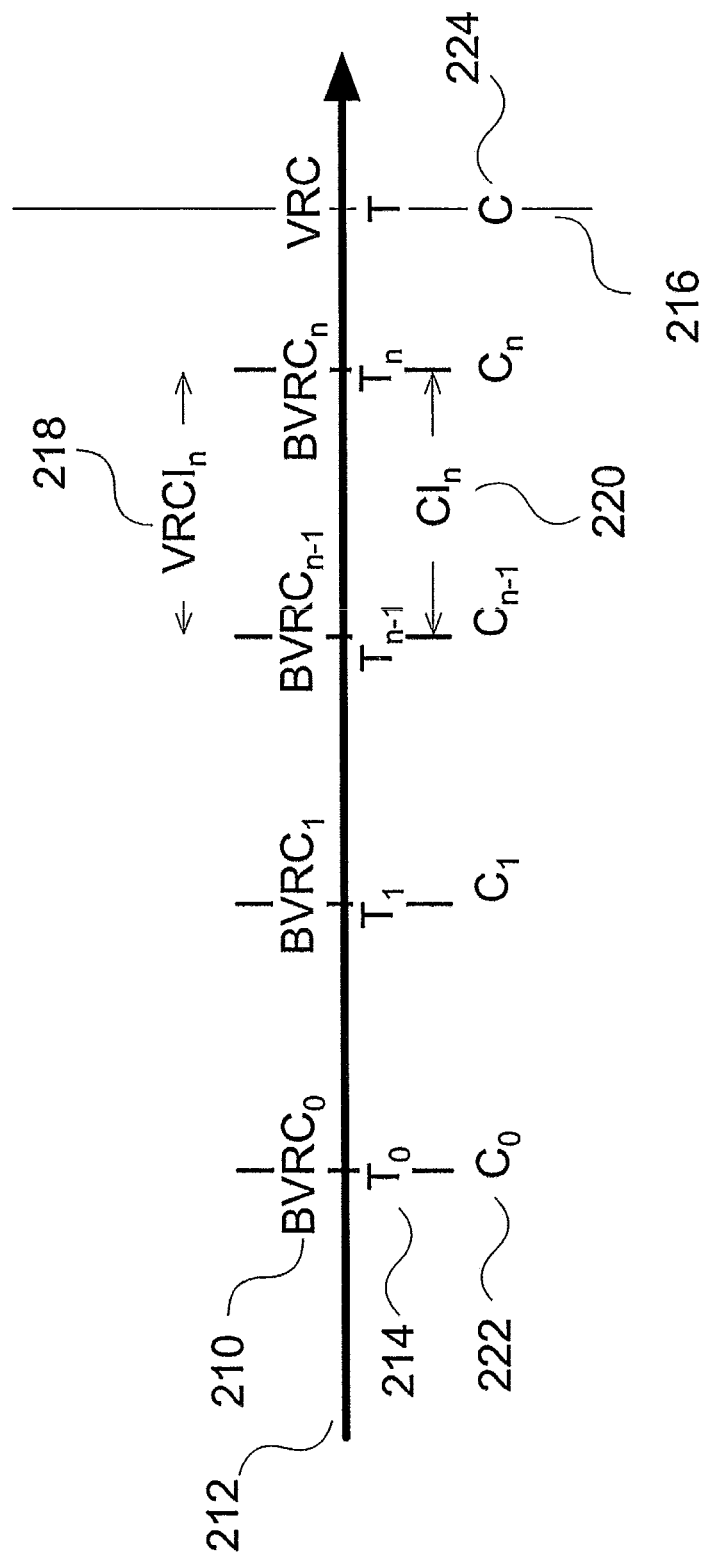
FIG. 13 is a timeline showing the effects of clock adjustment, according to an embodiment of the invention.

FIG. 13 Shows how this works in more detail. This shows a timeline 212 with periodic times 214 marked as $T_n$. These are times at which IRQ requests 146 are made of the system. At each time $T_n$, the corresponding BVRC value 210 is shown as $BVRC_n$. In addition, at each time $T_n$, the local CPU clock counter is read 222 as $C_n$.

Without inter block interpolation, at time T 216 that occurs after $T_n$ and before $T_{n+1}$, the VRC value read would be $BVRC_n$. This is obviously off from what it should be depending on how much T is into the block.

Inter block interpolation is performed by estimating the rate at which the Virtual Rendering Clock Count (VRC) is incrementing with respect to the local CPU clock count and using this to interpolate what the VRC clock count should be, when a VRC reading needs to be taken inside a block interval.

The rate at which the VRC is incrementing with respect to the local CPU clock count is calculated over the last Interval n as follows:

$$VRC\ Increase=VRCI_n=BVRC_n-BVRC_{n-1}$$

$$Local\ Clock\ Increase=CI_n=C_n-C_{n-1}$$

$$VRC\ Rate=VRCR_n=VRCI_n/CI_n$$

Therefore when a VRC reading needs to be taken at time T 216 the current local clock is read, by reading the clock register 136 (see FIG. 4) as value C.

This in then used to estimate how much VRC should have increased, by time T, since the last time it was incremented as follows.

$$VRC\ at\ Time\ T=BVRC_n+(VRCR_n)*(C-C_n)$$

The estimate of the rate at which VRC is increasing is measured over the last interval.

This works because, even though a different clock, the local CPU clock, based on the CPU crystal 102, (see FIG. 4) is used to make this estimation of the rendering clock count VRC, based on the audio crystal 103, this estimate is accurate, as the local CPU clock would not have drifted very much from, one block interval to the next. The actual rate of the CPU clock does not matter in this calculation as long as it has a rate that is higher than the sample rate. In practice most CPU crystals 102 and corresponding CPU clocks are in the tens of Mega Hertz range and therefore are more than is necessary.

If the CPU clock is a 20 MHz clock for example, this clock will have a resolution of $1/20^{th}$ of a micro seconds. This means that since VRC Increases are measured to an accuracy of 1 sample, VRC can be calculated to an accuracy of 1 rendering sample period.

FIG. 12 shows how the Local CPU clock measurements 202 (C) are made 201 during the ISR. The BVRC 196 and C 202 measurements are then used any time that a VRC value is needed to estimate 204 an accurate VRC value 206.

This mechanism of computing a block virtual rendering counter value and then interpolating to compute a more precise value for the virtual rendering count can be implemented in a variety of alternate ways. For example rather than doing the block estimation on the IRQ request 146, it can be done on the DMA request 142. All this would do is change the value of K used in the calculations above. It could also be done directly on the FIFO feed, by incrementing the counter every time a block of data samples are written into the FIFO 132 (See FIG. 6). In this case K would be the number of data samples written into the FIFO each time. It could also be done further up the data path inside ALSA 152 or before it 154.

Alternate embodiments may perform more sophisticated estimation, such as using a filter over more block intervals to compute a VRC Rate.

An issue with measuring the rate at which audio data is fed into the DAC as a measure of the DAC clock, is that audio data may not be playing all the time that measurement needs to be performed. Therefore this invention uses a zero data insertion mechanism, that inserts zero value audio data into the DAC data feed path when no real audio data is available or being played. Because the inserted audio data is zero valued, it does not cause any audio artifacts in the audio that is outputted by the system. The zero data insertion takes place up stream of where the measurement is being performed. If the measurement is being performed at the IRQ stage, then the zero insertion has to take place prior to that. If the measurement is being performed at the point the I2S FIFO is being loaded, the measurement only needs to take place prior to this point. In order to ensure that all measurement calculations stay valid, it is necessary to insert the zero value audio data right after the end of the last real audio data with no break in time between them. I.e. the first zero value sample inserted needs to be in the next consecutive sample frame slot after the last real value audio sample frame. Similarly the next first real audio data sample frame needs to be inserted into a frame slot right after a zero value sample time slot frame.

When the media is video rather than audio, the media data may be blank or black video. For the purposes of this description, zero value audio data and blank or black video data is referred to as zero value media.

In the above embodiment the block size K in each data request is constant. However, in other embodiments the block size K can vary with each request. The BVRC calculation will then simply account for this variable block size.

The VRC is a virtual clock count that increments according to the rate at which data requests are made by, or fed to, the DAC subsystem. While this is referred to as a Virtual Clock Counter, this is really a counter of the total number of samples, or frames in the case of video, that has been output at any particular time. It is really just a counter that is related to the rendering clock crystal. The VRC can be computed at any time. As described above the rate at which this VRC increments is directly related to the audio crystal rate. Therefore, the measure of the increase of the VRC clock count over an interval of time, say one second, is the clock rate of the VRC and is representative of the rate of the audio crystal. If the VRC on two destination devices 106 and 106', see FIG. 8, are measured over the same interval of time, one second, the percent difference in their respective VRC clock rates is representative of the percent difference of the rates of the audio crystals on these two destination devices 106 and 106'.

The second part of the problem is how to render the samples at the correct clock rate, after having measured a rendering clock frequency deviation.

Some approaches as shown in FIG. 9 use a clock synthesizer 107 to create a rendering clock 116 that can be adjusted via a control register 139. So if the system detects that the rendering clock is 44.3 KHz, the control register 139 can be used to decrease the clock rate until it meets a target rate. However, this approach is expensive and complicated as it requires hardware components such as an FPGA 107 or a clock synthesizer chipset or circuit that provides equivalent functionality and a means to control this via the CPU 114.

In this invention a low rate sample rate adjustment (SRA) algorithm is used to adjust the samples rather than to adjust the rendering clock.

Figure 14:
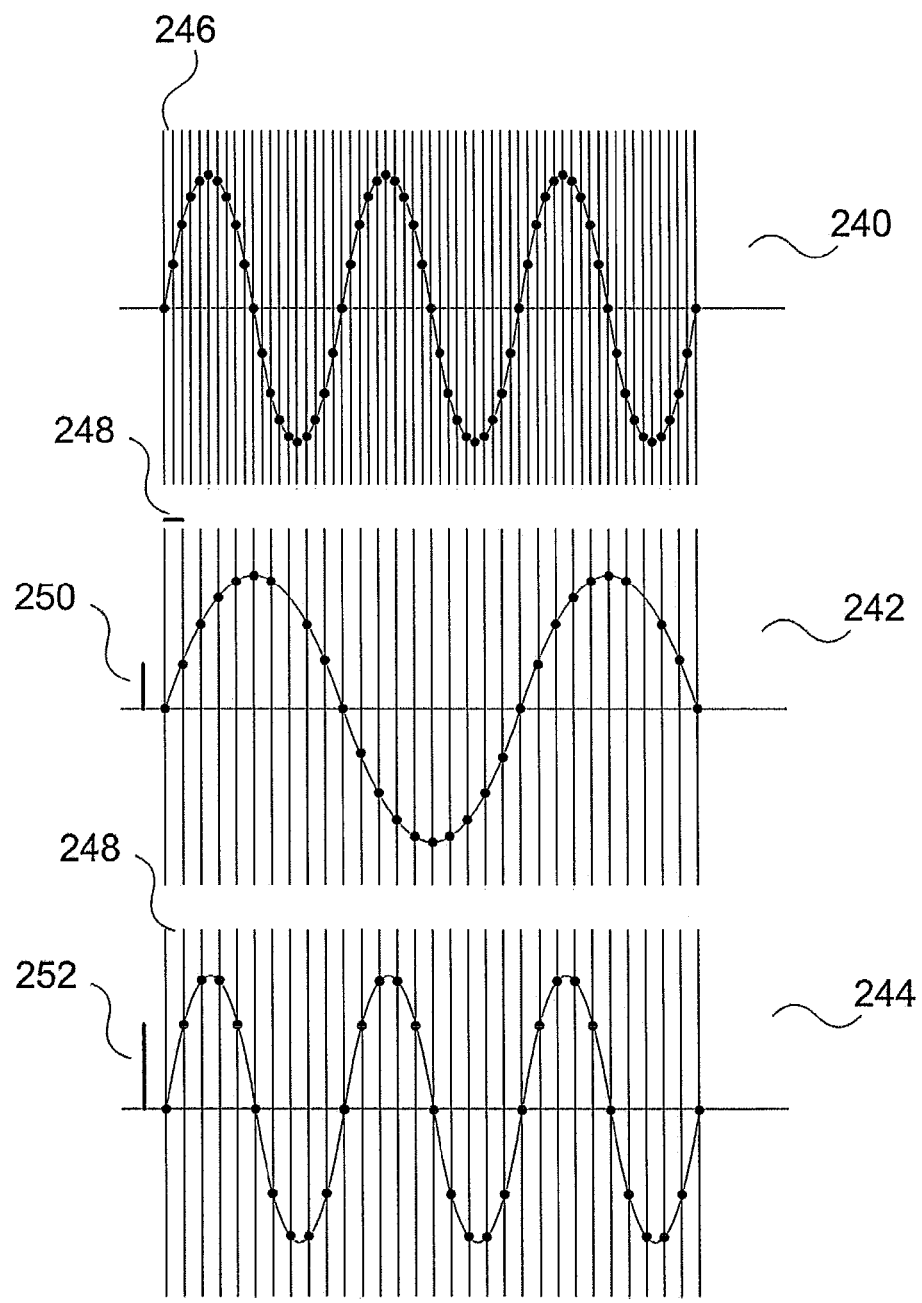
FIG. 14 is a diagram showing the effects of clock adjustments, according to an embodiment of the invention.

The concept is shown in FIG. 8 and FIG. 14. FIG. 8 shows two rendering devices 106 and 106' that have DAC that each render an output signal 220 and 220'. The DAC on each of these devices are driven by a rendering clock that may or may not be the same. FIG. 14 shows a more details plot of output signals 220 and 220'.

FIG. 14 shows three plots of audio samples being rendered by a device, with the vertical axis representing the DAC output for each audio sample and the horizontal axis representing the time at which each respective sample is rendered, which is done at the DAC rendering clock sample period.

The top plot 240 shows a detailed plot of the samples that are rendered 220 (FIG. 8) at a default rendering clock rate F1 246 on a first device 106 (FIG. 8). If a second device 106' (FIG. 8) is also rendering the same samples at a different rendering clock rate F2 that is lower, i.e. the rendering clock period 248 is longer, as shown in the second plot 242, then the output waveform 220' (FIG. 8) of the second device 106' looks like that shown in the second plot 242. In this case the very same samples rendered in the top plot 240, first device, are now rendered over a longer period in the second plot 242 of the second device.

If the rate of the two rendering clocks F1 and F2 on the two devices are measured using the techniques described above then the diff in the rendering clocks dF=F1−F2 (in Hz) can be computed. This difference dF can then be used to adjust F2 to make F2+dF=F1.

Therefore one way to fix the differences in the output is to adjust the rendering clock F2 on the second device 106' so that it's rendering period 248 is the same as the rendering period 246 on the first device 106. However, as mentioned above this can be difficult and expensive to do.

An alternative approach is to adjust the samples that are rendered (resample) by the second device 106' so that when rendered with its rendering clock period 248 that it produces an output that matches the output of the first device 106 shown in the first plot 240. This approach is to adjust the samples to be rendered by the second device 106' to account for the different clock rendering clock rate on the second device 106', rather than adjusting the rendering clock on the second device 106'. This is referred to as a sample rate adjustment.

An exaggerated view of the effect of this sample rate adjustment is shown in the lower plot 244. For example the in this case the amplitude of the second sample 252 in the adjusted sample data shown in the lower plot 244 is different from the amplitude of the second sample 250 shown in the second plot 242.

The overall effect of this sample rate adjustment is to produce an output signal 220' from the second device 106', shown in the lower plot 244 that is the same as the output signal 220 from the first device 106, shown in the top plot 240, even though the clock rate period 246 in the first device 106 is different from the clock rate period 248 in the second device 106'.

This sample rate adjustment can be performed in a variety of ways. A typical approach is to perform a sampler rate conversion (SRC) to convert from the rate the samples were originally to a rate that is increased by dF.

There are a number of ways to do this. One approach is to perform an interpolation between sample to create new samples at the new rate. An alternative approach is to up convert the sample rate to a rate that is a multiple of the current frequency F2 and dF+F2 and then down sample to the dF+F2 rate.

The standard approaches for doing this using standard sample rate conversion (SRC) algorithms are computationally intensive and can introduce aliasing noise into the converted samples.

This invention uses a low rate Sample Rate Adjustment (SRA) algorithm to perform an adjustment rather than a conversion. Traditional SRC modifies each and every sample. While this will work, it is CPU processor intensive and can add aliasing effects.

The SRA adjusts a few samples at a period that is low and below the typical audible rate of 20 Hz. The SRA recognizes that typically the rendering clock crystal and therefore the rendering clock used on a rendering devices is specified to an accuracy on the order of 50 ppm (Parts per million). If there are two rendering devices and the rendering frequency on one needs to be adjusted to match the other, the difference in frequency is going to be at most approximately 2×50 ppm or 100 ppm. This is about 0.01% of the clock rate. So this is an adjustment of approximately 1 in 10,000 samples. For a 44.1 KHz signal this is an adjustment at approximately 44.1 KHz/10K=4.41 Hz. For a 192 KHz signal the adjustment would be at a rate of 19.2 Hz, just at the lower edge of the bandwidth limit of most audio systems.

While this invention uses a low rate sample rate adjustment other embodiments may use other sample rate adjustment methods including standard Sample Rate Conversions techniques. For the purposes of this description the SRA and all Sample Rate Conversion techniques will be referred to as Sample Rate Conversion.

More generally, since the accuracy of the typical clock (50 ppm) is the maximum deviation, the dF value will actually be in the range −0.01%<dF<0.01%. Therefore the rate at which adjustments will be occurring is at a rate that is <20 Hz—even for 192 KHz media. This adjustment will therefore be filtered out by the audio signal path to the listener.

The implementation is to use a Frequency adjustment dF as a positive or negative % adjustment to the current samples, or simply as a ratio of samples input to samples actually rendered. A df of positive 0.01% means that adjustment algorithm needs to output 10001 samples for every 10000 put into it, or a ratio of 10001:10000. There are many ways to do this but for the reasons mentioned above, this invention simply duplicates or drops the last sample every I samples.

So if dF=positive 0.01%, the system will adjust samples every I samples, where I=100/df. If dF is positive the Ith sample is duplicated, where the Ith sample is the 100/dF sample. If dF is negative, the Ith sample is dropped, where the Ith sample is the 100/dF sample.

While this embodiment defines the sample rate adjustment as a percent of frequency adjustment, alternative adjustments could simply specify the number of samples to add or drop or define the adjustment in other ways.

In this invention the rendering clock is measured by measuring the data feed path that is feeding the DAC. However, any other device that is being driven from the same crystal, or is in the same clock domain that is driving the DAC, can be used. For example if a second I2S device is being driven by the same clock that is driving the DAC connected to the first I2S device, then this second I2S device can be used to measure the rendering clock. This can include feeding this second I2S device with dummy data, just so that the clock can be measured.

In this invention the primary example used is the rendering of audio media. However the same technique also applies to the rendering of video media. In this latter case the same concepts can be used. The media data, rather than being audio samples are video frames. The same algorithm applies by replacing samples with frames. The video is rendered by the rendering subsystem using a video DAC rather than an audio DAC. The video media is rendered based on a clock that may or may not be directly accessible for measurement. If not directly accessible, the rate at which video data is fed to the video subsystem, will be related to this video rendering clock and can be measured in blocks. An inter block times can be interpolated similar to the audio case.

Also, in the case of video, rather than adjusting the video rendering clock, the video media is adjusted to compensate for video rendering clock differences.

Additional Consideration

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of above description present the features of the present invention in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein.

The present invention is well suited to a wide variety of computer network systems over numerous topologies. Within this field, the configuration and management of large networks comprise storage devices and computers that are communicatively coupled to dissimilar computers and storage devices over a network, such as the Internet, public networks, private networks, or other networks enabling communication between computing systems.

The applications this invention are directed at that may be described above and any objects of this invention that are described above do not fully describe all the applications and objects of this invention and these descriptions are not intended to be limiting in any way or manner Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The skilled person will be aware of a range of possible modifications of the various embodiments described above. Accordingly, the present invention is defined by the claims and their equivalents.

What is claimed is:

1. A method for indirectly measuring and adjusting the rendering clock of a data rendering device, where the data rendering device comprises:
    a processing unit with access to a processing unit clock; and
    a data rendering subsystem, that renders data based on a rendering clock crystal that is separate from and independent of the processing unit clock;
    wherein the data rendering subsystem is coupled to the processing unit;
    wherein the data rendering subsystem receives data blocks from the processing unit at points of time; and
    wherein the processing unit computes a virtual clock counter using the sizes of the data blocks, the number of data blocks received over time, and the processing unit clock increment since a last data request.

2. The system of claim 1 that measures the rate of the rendering clock crystal using an increment of the virtual clock over an interval of time.

3. The system of claim 1, wherein the size of each data blocks is not the same.

4. The system of claim 1, wherein a data packet with a zero-value payload is sent to the data rendering subsystem when no other data is being sent to the rendering subsystem.

5. The system of claim 1, wherein the data blocks comprise video media data and further comprising a video DAC.

6. The system of claim 1, wherein the data rendering device uses adjustment information derived from a change of the virtual clock over an interval of time to perform a sample rate conversion of the data when rendering the data.

* * * * *